United States Patent
Gross et al.

(10) Patent No.: US 11,274,057 B2
(45) Date of Patent: *Mar. 15, 2022

(54) ION EXCHANGEABLE HIGH DAMAGE RESISTANCE GLASSES

(71) Applicant: CORNING INCORPORATED, Corning, NY (US)

(72) Inventors: Timothy Michael Gross, Corning, NY (US); Xiaoju Guo, Painted Post, NY (US); Charlene Marie Smith, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 243 days.

This patent is subject to a terminal disclaimer.

(21) Appl. No.: 16/184,479

(22) Filed: Nov. 8, 2018

(65) Prior Publication Data

US 2019/0077696 A1    Mar. 14, 2019

Related U.S. Application Data

(63) Continuation of application No. 14/541,771, filed on Nov. 14, 2014, now Pat. No. 10,125,044.

(Continued)

(51) Int. Cl.
*C03C 3/097* (2006.01)
*C03C 3/083* (2006.01)
(Continued)

(52) U.S. Cl.
CPC .............. *C03C 3/097* (2013.01); *C03C 3/083* (2013.01); *C03C 3/085* (2013.01); *C03C 3/087* (2013.01);
(Continued)

(58) Field of Classification Search
None
See application file for complete search history.

(56) References Cited

U.S. PATENT DOCUMENTS 3,772,135 A    11/1973    Hara et al.
4,461,839 A    7/1984    Rittler
(Continued)

FOREIGN PATENT DOCUMENTS

AU    2011101310 A4    11/2011
CN    102795766 A    11/2012
(Continued)

OTHER PUBLICATIONS

Dejneka et al., U.S. Appl. No. 61/759,061 (Year: 2013).*

(Continued)

*Primary Examiner* — David Sample
(74) *Attorney, Agent, or Firm* — Kevin M. Johnson

(57) ABSTRACT

Embodiments of glass composition including at least about 65 mol % $SiO_2$, $Al_2O_3$ in the range from about 7 mol % to about 11 mol %, $Na_2O$ in the range from about 13 mol % to about 16 mol %; and a non-zero amount of one or more alkali earth metal oxides selected from MgO, CaO and ZnO, wherein the sum of the alkali earth metal oxides is up to about 6 mol %, are disclosed. The glass compositions can be processed using fusion forming processes and float forming processes and are ion exchangeable. Glass articles including such glass compositions and methods of forming such glass articles are also disclosed. The glass articles of one or more embodiments exhibit a Vickers indentation crack initiation load of at least 8 kgf.

12 Claims, 8 Drawing Sheets

Related U.S. Application Data

(60) Provisional application No. 61/906,098, filed on Nov. 19, 2013.

(51) Int. Cl.
  *C03C 3/085* (2006.01)
  *C03C 3/087* (2006.01)
  *C03C 21/00* (2006.01)

(52) U.S. Cl.
  CPC ......... *C03C 21/002* (2013.01); *Y10T 428/265* (2015.01); *Y10T 428/315* (2015.01)

(56) References Cited

U.S. PATENT DOCUMENTS

| | | |
|---|---|---|
| 6,268,304 B1 | 7/2001 | Maeda et al. |
| 6,654,527 B2 | 11/2003 | Sakabe et al. |
| 8,312,739 B2 | 11/2012 | Lee et al. |
| 8,561,429 B2 | 10/2013 | Allan et al. |
| 9,714,188 B2 | 7/2017 | Fu et al. |
| 9,815,733 B2 * | 11/2017 | Dejneka ............... C03C 3/097 |
| 10,000,410 B2 * | 6/2018 | Dejneka ................ C03C 4/18 |
| 10,125,044 B2 * | 11/2018 | Gross ................ C03C 21/002 |
| 10,494,292 B2 * | 12/2019 | Dejneka ............... C03C 3/091 |
| 10,737,971 B2 * | 8/2020 | Gross ................ C03C 21/002 |
| 10,745,315 B2 * | 8/2020 | Dejneka ............. C03C 21/002 |
| 10,858,281 B2 * | 12/2020 | Dejneka ............... C03C 3/091 |
| 2005/0250639 A1 | 11/2005 | Siebers et al. |
| 2008/0286548 A1 | 11/2008 | Ellison et al. |
| 2009/0142568 A1 | 6/2009 | Dejneka et al. |
| 2009/0202808 A1 | 8/2009 | Glaesemann et al. |
| 2010/0009154 A1 | 1/2010 | Allan et al. |
| 2010/0035038 A1 | 2/2010 | Barefoot et al. |
| 2010/0291353 A1 | 11/2010 | Dejneka et al. |
| 2011/0014475 A1 | 1/2011 | Murata |
| 2011/0045961 A1 | 2/2011 | Dejneka et al. |
| 2011/0201490 A1 | 8/2011 | Barefoot et al. |
| 2011/0294648 A1 | 12/2011 | Chapman et al. |
| 2012/0135848 A1 | 5/2012 | Beall et al. |
| 2012/0196110 A1 | 8/2012 | Murata et al. |
| 2012/0297829 A1 | 11/2012 | Endo et al. |
| 2013/0004758 A1 | 1/2013 | Dejneka et al. |
| 2013/0011650 A1 | 1/2013 | Akiba et al. |
| 2013/0101596 A1 | 4/2013 | Demartino et al. |
| 2013/0233019 A1 | 9/2013 | Ellison et al. |
| 2013/0288001 A1 | 10/2013 | Murata et al. |
| 2014/0050911 A1 | 2/2014 | Mauro et al. |
| 2014/0170380 A1 * | 6/2014 | Murata ................ C03C 3/087 428/141 |
| 2014/0370066 A1 | 12/2014 | Beall et al. |
| 2015/0152003 A1 | 6/2015 | Kawamoto et al. |

FOREIGN PATENT DOCUMENTS

| | | |
|---|---|---|
| EP | 1593658 B1 | 12/2007 |
| JP | 2009233911 A | 10/2009 |
| JP | 2010-527892 A | 8/2010 |
| JP | 2012-148909 A | 8/2012 |
| JP | 2012-180270 A | 9/2012 |
| JP | 2013-043795 A | 3/2013 |
| WO | 2012099053 A1 | 7/2012 |
| WO | 2012126394 A1 | 9/2012 |
| WO | 2013027675 A1 | 2/2013 |
| WO | 2013/055994 A1 | 4/2013 |
| WO | 2014/028284 A1 | 2/2014 |
| WO | 2015031188 A1 | 3/2015 |

OTHER PUBLICATIONS

Dejneka et al., U.S. Appl. No. 61/871,471 (Year: 2013).*
Foreign Priority Document for USPGPub. 2015/0152003, JP2012133451, Kawamoto et al. (Year: 2012).
Foreign Priority Document for USPGPub. 2015/0152003, JP2012172541, Kawamoto et al. (Year: 2012).
Foreign Priority Document for USPGPub. 2015/0152003, JP2012202409, Kawamoto et al. (Year: 2012).
Foreign Priority Document for USPGPub. 2015/0152003, JP2012272120, Kawamoto et al. (Year: 2012).
Foreign Priority Document for USPGPub. 2015/0152003, JP2013018362, Kawamoto et al. (Year: 2013).
International Search Report and Written Opinion of the International Searching Authority; PCT/US2014/065611; dated Apr. 10, 2015, 12 Pgs.
K. Kobayashi et al., "Chemical Strengthening of Glass and Industrial Application," UDC 666.181: 541.573, 52 (1977), pp. 109-112.
Kishii, "Surface Stress Meters Utilising the Optical Waveguide Effect of Chemically Tempered Glasses," Optics & Lasers in Engineering 4 (1983) pp. 25-38.
Japanese Patent Application No. 2016530181; Machine Translation of the Office Action dated Dec. 4, 2019; Japan Patent Office; 3 Pgs.
European Patent Application No. 14803028.1 Office Action dated Apr. 17, 2019; 6 pages; European Patent Office.
Korean Patent Application No. 10-2016-7015406, Office Action dated Oct. 16, 2020, 7 pages (3 page of English Translation and 4 pages of Original Document); Korean Patent Office.

* cited by examiner

US 11,274,057 B2

ION EXCHANGEABLE HIGH DAMAGE RESISTANCE GLASSES

CROSS-REFERENCE TO RELATED APPLICATIONS

This application is a continuation of U.S. patent application Ser. No. 14/541,771, filed Nov. 14, 2014, which claims the benefit of priority under 35 U.S.C. § 119 of U.S. Provisional Application Ser. No. 61/906,098, filed on Nov. 19, 2013, the content of which is relied upon and incorporated herein by reference in its entirety.

BACKGROUND

The disclosure relates to ion-exchangeable glass compositions and strengthened glass articles formed from the same that exhibit high damage resistance, and more particularly to ion-exchangeable glass compositions that can be formed into glass articles by fusion and float processes.

Devices such as electronic devices (e.g., mobile phones, smart phones, tablets, video players, information terminal devices, laptop computer, etc.), appliances (e.g., cooktops, refrigerator and dishwasher doors, etc.), information displays (e.g., whiteboards), and automotive components (e.g., dashboards, windshields, window components, etc.) incorporate various glass articles. The glass articles can be part of a display in such articles. When used in a display, the glass article may be referred to as a cover glass article and, in some instances, may form part of a touch module.

Such uses of glass articles often require the glass article to exhibit a requisite amount of damage resistance. Glass articles that are strengthened by, for example, an ion exchange process, typically exhibit the requisite damage resistance. Such glass articles may be formed by float processes or fusion processes; however, known glass compositions do not permit the use of both processes due to the presence of certain corrosive components and properties that are incompatible with one of the processes. Accordingly, there is a need for glass compositions that can be used in fusion and float processes to form glass articles that may be strengthened and that exhibit damage resistance.

SUMMARY

A first aspect of this disclosure pertains to a glass composition including at least about 65 mol % or at least about 70 mol % $SiO_2$, $Al_2O_3$ in the range from about 7 mol % to about 11 mol %, $Na_2O$ in the range from about 8 mol % to about 16 mol %, and a non-zero amount of one or more alkali earth metal oxides selected from MgO, CaO and ZnO. In one or more embodiments, the sum of the alkali earth metal oxides is up to about 6 mol % or, alternatively, in the range from about 2 mol % to about 6 mol %.

In one or more embodiments, the glass composition may include a non-zero amount of $P_2O_5$ up to about 3 mol %, and/or a less than about 5 mol % $B_2O_3$. The glass composition may optionally include one or more of $K_2O$, $Li_2O$, $Fe_2O_3$ and $ZrO_2$. The glass composition according to some embodiments may also include $SnO_2$.

The composition may exhibit a viscosity at 1300° C. of less than about 15 kP or less than about 10 kP. In some embodiments, the glass composition may exhibit a liquidus temperature of 1100° C. or less.

A second aspect of this disclosure pertains to glass articles including or made from the glass compositions disclosed herein. The glass articles may be included in electronic devices and may form the cover glass or other components of a display for such electronic devices.

In one or more embodiments, the glass articles may be strengthened by a chemical strengthening process such as an ion exchange process. The degree of chemical strengthening achieved by ion exchange may be quantified based on the parameters of central tension (CT), compressive stress (CS), and depth of layer (DOL). Compressive stress (CS) may be measured near the surface or within the strengthened glass article at various depths. The ion exchange process yields a compressive stress layer having a thickness defined as a depth of layer (DOL). A maximum compressive stress value may include the measured a compressive stress (CS) of the strengthened glass article. In one or more embodiments, the glass article may include a compressive stress layer that extends from a surface of the glass article to a depth of layer. The compressive stress layer may exhibit a compressive stress of about 500 MPa or greater or 700 MPa or greater. The depth of the compressive stress layer or the depth of layer (DOL), extending from a surface of the glass article into the glass article, may be about 30 μm or greater.

In one or more embodiments, the compressive stress layer having a compressive stress of 700 MPa or greater and a depth of layer of about 30 μm or greater may be formed by ion exchanging the glass article for about 4 hours or less. In other embodiments, the compressive stress layer including a compressive stress of 650 MPa or greater and a depth of layer of about 40 μm or greater may be formed by ion exchanging the glass article for about 8 hours or less. In yet other embodiments, the compressive stress layer including a compressive stress of 650 MPa or greater and a depth of layer of about 50 μm or greater may be formed by ion exchanging the glass article for less than about 16 hours.

In one or more embodiments, the glass article exhibits a Vickers indentation crack initiation load of at least about 8 kgf or at least about 14 kgf.

The glass article of some embodiments may be a float-formed glass article or formed using a float process. In other embodiments, the glass article may be a fusion-formed glass article, or formed from a fusion process.

In one or more alternative embodiments, the glass article may include a surface layer having a glass composition as disclosed herein. For example, the glass article may include a surface layer having a glass composition of at least about 65 mol % or at least about 70 mol % $SiO_2$, $Al_2O_3$ in the range from about 7 mol % to about 11 mol %, $Na_2O$ in the range from about 8 mol % to about 16 mol %, and a non-zero amount of one or more alkali earth metal oxides selected from MgO, CaO and ZnO. The remainder of the glass article (excluding the surface layer) may have a different glass composition. In some embodiments, the surface layer extends from a surface of the glass article into the glass article and may have a thickness of at least 100 nm. Such glass articles may also include a compressive stress layer extending from the first surface of the glass article to a depth of layer. The compressive stress layer may exhibit a compressive stress of about 500 MPa or greater and the depth of layer extending from a surface of the glass article into the glass article may be about 30 μm or greater.

A third aspect of this disclosure pertains to a method of forming the glass articles disclosed herein. In one or more embodiments, the method includes melting a batch of a glass composition, as described herein, and forming the glass article by a fusion process or a float process. The method may include subjecting the glass article to ion exchange treatment to form a compressive stress layer within the glass article. For example, the ion exchange treatment may last for less than 16 hours. The resulting compressive stress layer may have a compressive stress of at least about 700 MPa and the compressive stress layer may extends from a surface of the glass article into the glass article at a depth of layer of at least about 50 µm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
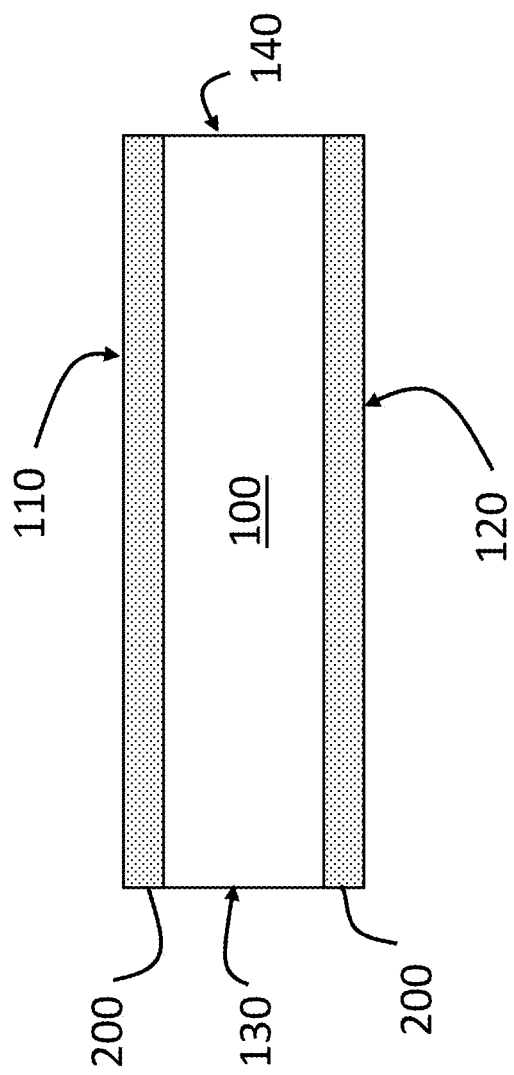
FIG. 1 shows a side view of a glass article according to one or more embodiments.

Reference will now be made in detail to the present preferred embodiment(s), an example of which is/are illustrated in the accompanying drawings. Whenever possible, the same reference numerals will be used throughout the drawings to refer to the same or like parts.

In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween. Unless otherwise specified, all compositions and relationships that include constituents of compositions described herein are expressed in mole percent (mol %).

A first aspect of this disclosure pertains to a glass composition including $SiO_2$, $Al_2O_3$, $Na_2O$, one or more alkali earth metal oxides and, optionally, $P_2O_5$. The glass compositions according to one or more embodiments are ion exchangeable and, in some embodiments, exhibit a high temperature viscosity at 1300° C., enabling the glass composition to be processed using a fusion process and/or float process. In other words, the glass compositions according to one or more embodiments may be formed into glass articles of various kinds using a fusion process or a float process, as will be described in greater detail herein. As will also be described herein, the ion exchange rates of glass articles formed from the described glass compositions are comparable to or even improved over glass articles including known, fusion-formable, glass compositions. For example, the glass compositions according to one or more embodiments of this disclosure can achieve, after undergoing an ion exchange process at a temperature of about 410° C. for a duration of about 10 hours or less, a compressive stress layer exhibiting a depth of layer (or thickness) of about 50 µm or greater. Glass articles including the glass compositions disclosed herein may exhibit an indentation fracture threshold that is the same or greater than articles including known fusion formable glass compositions.

One or more embodiments of the glass composition include at least about 65 mol % $SiO_2$, $Al_2O_3$ in the range from about 7 mol % to about 11 mol %, $Na_2O$ in the range from about 8 mol % to about 16 mol %, and a non-zero amount of one or more alkali earth metal oxides selected from MgO, CaO and ZnO.

In one or more embodiments, the amount of $SiO_2$ may include 66 mol % or greater, 67 mol % or greater, 68 mol % or greater, 69 mol % or greater, 70 mol % or greater, 71 mol % or greater, 72 mol % or greater, 73 mol % or greater, 74 mol % or greater, 75 mol % or greater and all ranges and sub-ranges therebetween. In one or more embodiments, $SiO_2$ may be present in the range from about 65 mol % to about 76 mol %, 66 mol % to about 76 mol %, 67 mol % to about 76 ml %, 68 mol % to about 76 mol %, 69 mol % to about 76 mol %, 65 mol % to about 75 mol %, 65 mol % to about 74 mol %, 65 mol % to about 73 mol %, 65 mol % to about 72 mol %, 65 mol % to about 71 mol %, 65 mol % to about 70 mol %, 65 mol % to about 69 mol % and all ranges and sub-ranges therebetween. In one or more specific embodiments, the glass composition may include $SiO_2$ in an amount in the range from about 69 mol % to about 72 mol %, from about 69.5 mol % to about 71.5 mol %, from about 70 mol % to about 71 mol %, greater than about 70 mol % and less than about 72 mol % and all ranges and sub-ranges therebetween. The lower limit of $SiO_2$ may include 67 mol %, 67.5 mol %, 68 mol %, 68.5 mol %, 69 mol5, 69.5 mol %, 70 mol %, 70.5 mol % and all ranges and sub-ranges therebetween. The upper limit of $SiO_2$ in one or more embodiments can include 75.5 mol %, 75.6 mol %, 75.7 mol %, 75.8 mol %, 75.9 mol %, 76 mol %, 76.1 mol %, 76.2 mol %, 76.3 mol %, 76.4 mol %, 76.5 mol %, 76.6 mol %, 76.7 mol %, 76.8 mol %, 76.9 mol %, 77 mol % and all ranges and sub-ranges therebetween.

In the embodiments of the glass compositions described herein, $SiO_2$ serves as the primary glass-forming oxide. The amount of $SiO_2$ present in a glass composition should be sufficient to provide a glass article formed from the glass composition that exhibits the requisite chemical durability suitable for its use or application (e.g., touch applications). The upper limit of $SiO_2$ may be selected to control the melting temperature of the glass compositions described herein. For example, excess $SiO_2$ could drive the melting temperature at 200 poise to high temperatures at which defects such as fining bubbles may appear or be generated during processing and in the resulting glass article. Furthermore, compared to most oxides, $SiO_2$ decreases the compressive stress created by ion exchange. In other words, glass articles formed from glass compositions with excess $SiO_2$ may not be ion-exchangeable to the same degree as glass articles formed from glass compositions without excess $SiO_2$. It is also believed that glass compositions with excess $SiO_2$ are more difficult to melt during the glass forming process than glass compositions with less $SiO_2$. In one or more specific embodiments, the $SiO_2$ present in the glass composition may open up the glass article structure. Additionally or alternatively, $SiO_2$ present in the glass compositions according to one or more embodiments could increase the plastic deformation prior break properties of the resulting glass articles. $SiO_2$ content in the glass articles formed from the glass compositions described herein may also increase the indentation fracture threshold of the glass article.

In one or more embodiments, the glass composition may include $Al_2O_3$ in an amount in the range from about 5 mol % to about 15 mol %, from about 5 mol % to about 14 mol %, from about 5 mol % to about 13 mol %, from about 5 mol % to about 12 mol %, from about 5 mol % to about 11 mol %, from about 5 mol % to about 10 mol %, from about 6 mol % to about 15 mol %, from about 7 mol % to about 15 mol %, from about 8 mol % to about 15 mol %, from about 9 mol % to about 15 mol %, from about 10 mol % to about 15 mol %, and all ranges and sub-ranges therebetween. The lower limit of $Al_2O_3$ in one or more embodiments of the glass composition may include 8 mol %, 8.2 mol %, 8.4 mol %, 8.6 mol %, 8.8 mol %, 9 mol % and all ranges and sub-ranges therebetween. In one or more embodiments, the upper limit of $Al_2O_3$ may be 10 mol %, 10.2 mol %, 10.4 mol %, 10.8 mol %, 11 mol %, 11.2 mol %, 11.4 mol %, 11.6 mol %, 11.8 mol %, 12 mol % and all ranges and sub-ranges therebetween. In one or more specific embodiments, $Al_2O_3$ may be present in an amount of about 9 mol %, 9.2 mol %, 9.4 mol %, 9.6 mol %, 9.8 mol %, 10 mol %, 10.2 mol %, 10.4 mol %, 10.6 mol %, 10.8 mol % and all ranges and sub-ranges therebetween.

The amount of $Al_2O_3$ may be adjusted to serve as a glass forming oxide and/or to control the viscosity of molten glass compositions. In one or more embodiments, an increase in the amount of $Al_2O_3$ in a glass composition relative to other alkalis and/or alkaline earths can improve or increase the durability of a glass article formed from such glass composition. Without being bound by theory, it is believed that when the concentration of alkali oxide ($R_2O$) in a glass composition is equal to or greater than the concentration of $Al_2O_3$, the aluminum ions are found in tetrahedral coordination with the alkali ions acting as charge-balancers. This tetrahedral coordination greatly enhances ion exchange of glass articles formed from such glass compositions. This is demonstrated in some of the Examples listed in Table 1 herein. In the other Examples listed in Table 1, the concentration of alkali oxide is less than the concentration of aluminum ions; in this case, the divalent cation oxides (RO) can also charge balance tetrahedral aluminum to various extents. While elements such as calcium, zinc, strontium, and barium behave equivalently to two alkali ions, the high field strength of magnesium ions causes them to not fully charge balance aluminum in tetrahedral coordination, resulting in the formation of five- and six-fold coordinated aluminum. Generally, $Al_2O_3$ can play an important role in ion-exchangeable glass compositions and strengthened glass articles since it enables a strong network backbone (i.e., high strain point) while allowing for the relatively fast diffusivity of alkali ions. However, when the concentration of $Al_2O_3$ is too high, the glass composition may exhibit lower liquidus viscosity and, thus, $Al_2O_3$ concentration may be controlled within a reasonable range. It is also believed that glass compositions with excess $Al_2O_3$ are more difficult to melt during the glass forming process than glass compositions with less $Al_2O_3$.

In one or more embodiments, the glass composition may include one or more divalent cation oxides, such as alkaline earth oxides and/or ZnO. Such divalent cation oxides may be included to improve the melting behavior of the glass compositions. With respect to ion exchange performance, the presence of divalent cations can act to decrease alkali mobility. When larger divalent cation oxides are utilized, there may be a negative effect on ion exchange performance. Furthermore, smaller divalent cation oxides generally help the compressive stress developed in an ion exchanged glass article more than the larger divalent cation oxides. Hence, divalent cation oxides such as MgO and ZnO can offer advantages with respect to improved stress relaxation, while minimizing the adverse effects on alkali diffusivity. In one or more embodiments, the glass composition may incorporate MgO and/or ZnO as the only divalent cation oxide and may, optionally, be substantially free of any other divalent cation oxides.

As used herein, the phrase "substantially free" with respect to the components of the glass composition and/or glass article means that the component is not actively or intentionally added to the glass compositions during initial batching or subsequent ion exchange, but may be present as an impurity. For example, a glass composition or a glass article may be describe as being substantially free of a component, when the component is present in an amount of less than about 0.10 mol %.

The glass composition in accordance with some embodiments may include one or more alkali earth metal oxides, such as MgO, CaO and ZnO. In some embodiments, the total amount of the one or more alkali earth metal oxides may be a non-zero amount up to about 6 mol %. In one or more specific embodiments, the amount of any of the alkali earth metal oxides may be up to about 6 mol %, up to about 5.5 mol %, up to about 5 mol %, up to about 4.5 mol %, up to about 4 mol %, up to about 3.5 mol %, up to about 3 mol %, up about 2.5 mol %, up to about 2 mol %, up to about 1.5 mol %, up to about 1 mol %, up to about 0.5 mol %, up to about 1 mol %, up to about 0.5 mol % and all ranges and sub-ranges therebetween provided that the sum of the alkali earth metal oxides does not exceed about 6 mol %. In some embodiments, the total amount of alkali earth metal oxides may be in the range from about 2 mol % to about 6 mol %, from about 2 mol % to about 5.5 mol %, from about 2 mol % to about 5 mol %, from about 2 mol % to about 4.5 mol %, from about 2 mol % to about 4 mol %, from about 2 mol % to about 3.5 mol %, from about 2.5 mol % to about 6 mol %, from about 3 mol % to about 6 mol %, from about 3.5 mol % to about 6 mol %, from about 4 mol % to about 6 mol %, from about 4.5 mol % to about 6 mol % and all ranges and sub-ranges therebetween.

In one or more embodiments, the glass composition may include MgO and may be substantially free of CaO and ZnO. In one variant, the glass composition may include CaO and may be substantially free of MgO and ZnO. In another variant, the glass composition may include ZnO and be substantially free of CaO and MgO. In one or more specific embodiments, the glass composition may include only two of the alkali earth metal oxides of MgO, CaO and ZnO and may be substantially free of the third of the earth metal oxides. In yet another variant, the glass composition may include all three of MgO, CaO and ZnO.

In one or more embodiments, the glass composition includes $Na_2O$ in an amount in the range from about 8 mol % to about 18 mol %, from about 9 mol % to about 18 mol %, from about 10 mol % to about 18 mol %, from about 12 mol % to about 18 mol %, from about 13 mol % to about 16 mol % or from about 15 mol % to about 16 mol %. In one or more specific embodiments, the $Na_2O$ is present in an amount in the range from about 8 mol % to about 17.5 mol %, from about 8 mol % to about 17 mol %, from about 8 mol % to about 16.5 mol %, from about 8 mol % to about 16 mol %, from about 8 mol % to about 15.5 mol %, from about 8 mol % to about 15 mol %, from about 8.5 mol % to about 15 mol %, from about 9 mol % to about 15 mol %, from about 9.5 mol % to about 15 mol %, from about 10 mol % to about 15 mol %, from about 10.5 mol % to about 18 mol %, from about 11 mol % to about 18 mol %, from about 11.5 mol % to about 18 mol %, from about 12 mol % to about 18 mol %, from about 12.5 mol % to about 18 mol %, from about 13 mol % to about 18 mol %, from about 13.5 mol % to about 18 mol %, from about 14 mol % to about 18 mol % from about 15 mol % to about 18 mol %, and all ranges and sub-ranges therebetween. In specific embodiments, $Na_2O$ may be present in an amount of about 15.1 mol %, 15.2 mol %, 15.3 mol %, 15.4 mol %, 15.5 mol %, 15.6 mol %, 15.7 mol %, 15.8 mol %, 15.9 mol %, or 16 mol %.

In one or more embodiments, the glass composition may include $K_2O$. In such embodiments, the $K_2O$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of $K_2O$.

In one or more embodiments, the glass composition may include $Li_2O$. In such embodiments, the $Li_2O$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of $Li_2O$.

Other alkali oxides such as $Rb_2O$ and $Cs_2O$ may be present in the glass composition of one or more embodiments. Such alkali oxides may be present in the same or different amounts as disclosed herein with respect to $Li_2O$ and $K_2O$. Optionally, the glass compositions may be substantially free, as defined herein, of $Rb_2O$ and/or $Cs_2O$ Alkali oxides ($R_2O$) (e.g., $Li_2O$, $Na_2O$, $K_2O$, $Rb_2O$ and/or $Cs_2O$), present in the glass compositions described herein to modify the melting temperature and/or liquidus temperatures of such compositions. In one or more embodiments, the amount of alkali oxides present in a glass composition may be adjusted to provide a glass composition exhibiting a low melting temperature and/or a low liquidus temperature. Without being bound by theory, the addition of alkali oxide(s) may increase the coefficient of thermal expansion (CTE) and/or lower the chemical durability of the glass articles that include such glass compositions. In some cases these attributes may be altered dramatically by the addition of alkali oxide(s). In some embodiments, to perform ion exchange, the presence of a small amount of alkali oxide (such as $Li_2O$ and $Na_2O$) is required to facilitate ion exchange with larger alkali ions (e.g., K+), for example exchanging smaller alkali ions from a glass article with larger alkali ions from a molten salt bath containing such larger alkali ions. As will be discussed in greater detail herein, three types of ion exchange can generally be carried out. One such ion exchange includes a Na+-for-Li+ exchange, which results in a deep depth of layer but low compressive stress. Another such ion exchange includes a K+-for-Li+ exchange, which results in a small depth of layer but a relatively large compressive stress. A third such ion exchange includes a K+-for-Na+ exchange, which results in intermediate depth of layer and compressive stress. A sufficiently high concentration of the small alkali oxide in glass compositions may be necessary to produce a large compressive stress in the glass article including such glass compositions, since compressive stress is proportional to the number of alkali ions that are exchanged out of the glass article. In some of the Examples shown in Table 1, a small amount of $K_2O$ is introduced into the glass composition to improve diffusivity and lower the liquidus temperature. However, the content of $K_2O$ may be controlled (e.g., to a low level, very low level, to none at all or as otherwise described herein) to avoid undesirable increases in coefficient of thermal expansion (CTE) and/or decreases in compressive stress (CS) in the resulting glass article.

In one or more embodiments, the glass composition may include $Fe_2O_3$. In such embodiments, $Fe_2O_3$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more embodiments, the amount of $Fe_2O_3$ may be controlled to tramp levels, depending on the raw materials utilized. Alternatively or additionally, the amount of $Fe_2O_3$ may be added intentionally to add color and/or UV blocking properties. In one or more alternative embodiments, the glass composition may be substantially free, as defined herein, of $Fe_2O_3$.

In one or more embodiments, the glass composition may include $ZrO_2$. In such embodiments, $ZrO_2$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of $ZrO_2$.

In one or more embodiments, the glass composition may include a non-zero amount of $P_2O_5$. In one or more embodiments, the upper limit of $P_2O_5$ may be about 7 mol %, 6 mol %, 5 mol %, about 4 mol %, or about 3 mol %. In one or more specific embodiments, $P_2O_5$ may be present in the range from about 0.01 mol % to about 7 mol %, from about 0.1 mol % to about 7 mol %, from about 0.2 mol % to about 7 mol %, from about 0.3 mol % to about 7 mol %, from about 0.4 mol % to about 7 mol %, from about 0.5 mol %, to about 7 mol %, from about 0.6 mol % to about 7 mol %, from about 0.7 mol % to about 7 mol %, from about 0.8 mol % to about 7 mol %, from about 0.9 mol % to about 7 mol %, from about 1 mol % to about 7 mol %, from about 0.01 mol % to about 6.8 mol %, from about 0.01 mol % to about 6.6 mol %, from about 0.01 mol % to about 6.4 mol %, from about 0.01 mol % to about 6.2 mol %, from about 0.01 mol % to about 6 mol %, from about 0.01 mol % to about 5.8 mol %, from about 0.01 mol % to about 5.6 mol %, from about 0.01 mol % to about 5.4 mol %, from about 0.01 mol % to about 5.2 mol %, from about 0.01 mol % to about 5 mol %, from about 0.01 mol % to about 4.9 mol %, from about 0.01 mol % to about 4.8 mol %, from about 0.01 mol % to about 4.7 mol %, from about 0.01 mol % to about 4.6 mol %, from about 0.01 mol % to about 4.5 mol %, from about 0.01 mol % to about 4.4 mol %, from about 0.01 mol % to about 4.2 mol %, from about 0.01 mol % to about 4.1 mol %, from about 0.01 mol % to about 4 mol %, and all ranges and sub-ranges therebetween. In yet other specific embodiments, $P_2O_5$ may be present in an amount of about 0.1 mol %, 0.2 mol %, 0.3 mol %, 0.4 mol %, 0.5 mol %, 0.6 mol %, 0.7 mol %, 0.8 mol %, 0.9 mol %, 1 mol %, 1.1 mol %, 1.2 mol %, 1.3 mol %, 1.4 mol %, 1.5 mol %, 1.6 mol %, 1.7 mol %, 1.8 mol %, 1.9 mol %, 2 mol %, 2.1 mol %, 2.2 mol %, 2.3 mol %, 2.4 mol %, 2.5 mol %, 2.6 mol %, 2.7 mol %, 2.8 mol %, 2.9 mol %, 3 mol % and all ranges and sub-ranges therebetween.

In one or more embodiments, the amount of $P_2O_5$ in a glass composition may be adjusted based on the desired damage resistance of the glass article that includes such glass composition. Without being bound by theory, $P_2O_5$ can decrease the melting viscosity relative to $SiO_2$. In some instances, $P_2O_5$ is believed to help to suppress zircon breakdown viscosity (i.e., the viscosity at which zircon breaks down to form $ZrO_2$) and may be more effective in this regard than $SiO_2$. $P_2O_5$ can improve the diffusivity and decrease ion exchange times, when compared to other components that are sometimes characterized as network formers (e.g., $SiO_2$ and/or $B_2O_3$).

In one or more embodiments, the glass composition is substantially free of $B_2O_3$. Without being bound by theory, it is believed the inclusion of $B_2O_3$ in glass compositions imparts damage resistance in glass articles incorporating such glass compositions. It is also believed that $B_2O_3$ is a contributor or even a main contributor to improving damage resistance; however, it is also believed that $B_2O_3$ votalization in the melting process is corrosive to current refractory materials in the fusion process and in the float process. Accordingly, in one or more embodiments of the glass compositions disclosed herein are substantially free of $B_2O_3$ but still exhibit the requisite damage resistance. In addition, the glass compositions that are substantially free of $B_2O_3$ are compatible with float and fusion processes because such glass compositions do not exhibit the same corrosiveness as compositions that include $B_2O_3$.

In one or more alternative embodiments, the glass composition may include a non-zero amount of $B_2O_3$ that is less than about 5 mol %, less than about 4 mol %, less than about 3 mol %, less than about 2 mol %, less than about 1 mol %, less than about 0.1 mol % and all ranges and sub-ranges therebetween.

The glass composition according to one or more embodiments may further include a non-zero amount of $SnO_2$ up to about 2 mol %. For example, $SnO_2$ may be present in the range from about 0 to about 2, from about 0 to about 1, from about 0.1 to about 2, from about 0.1 to about 1, from about 1 to about 2 and all ranges and sub-ranges therebetween. In one or more embodiments, the amount of $SnO_2$, in mol %, may be about 0.01, 0.1, 0.2, 0.3, 0.4, 0.5, 0.6, 0.7, 0.8 0.9, 1, 1.1, 1.2, 1.3, 1.4, 1.5, 1.6, 1.7, 1.8, 1.9, 2.0, and all ranges and sub-ranges therebetween. The glass compositions disclosed herein may be substantially free of $As_2O_3$ and/or $Sb_2O_3$.

In one or more embodiments, the glass composition exhibits a viscosity at 1300° C. of less than about 15 kP, less than about 14 kP, less than about 13 kP, less than about 12 kP, less than about 11 kP, less than about 10 kP, less than about 9 kP, less than about 8 kP, less than about 7 kP or even less than about 6 kP. Without being bound by theory, it is believed that glass compositions exhibiting a viscosity at 1300° C. of less than about 10 kP is float processable or, in other words, can be processed in the tin baths utilized in float processes. In some embodiments, the viscosity at 1300° C. of the glass composition may be in the range from about 5 kP to about 15 kP, from about 5 kP to about 14 kP, from about 5 kP to about 13 kP, from about 5 kP to about 12 kP, from about 5 kP to about 11 kP, from about 5 kP to about 10 kP, from about 5 kP to about 9 kP, from about 5 kP to about 8 kP, from about 5 kP to about 7 kP, from about 6 kP to about 15 kP, from about 7 kP to about 15 kP, from about 8 kP to about 15 kP, from about 9 kP to about 15 kP, from about 10 kP to about 15 kP and all ranges and sub-ranges therebetween. In one or more embodiments, the glass composition may exhibit a viscosity at 1300° C. of about 5 kP, 5.5 kP, 6 kP, 6.5 kP, 7 kP, 7.5 kP, 8 kP, 8.5 kP, 9 kP, 9.5 kP, 10 kP, 10.5 kP, 11 kP, 11.5 kP, 12 kP, 12.5 kP, 13 kP, 13.5 kP, 14 kP, 14.5 kP or 15 kP and all ranges and sub-ranges therebetween.

The glass composition according to one or more embodiments exhibits a liquidus temperature of about 1100° C. or less. In one embodiment, the liquid temperature is in the range from about 1100° C. to about 750° C. In some embodiments, the lower limit of the liquidus temperature may be about 760° C., 770° C., 780° C., 790° C., 800° C. and all ranges and sub-ranges therebetween.

In one or more embodiments, the glass composition exhibits a melting temperature or a 200 poise temperature of at least about 1400° C., or in the range from about 1400° C. to 1800° C. In one or more embodiments, the melting temperature or the 200 poise temperature is in the range from about 1425° C. to about 1800° C., from about 1450° C. to about 1800° C., from about 1475° C. to about 1800° C., from about 1500° C. to about 1800° C., from about 1525° C. to about 1800° C., from about 1550° C. to about 1800° C., from about 1575° C. to about 1800° C., from about 1400° C. to about 1775° C., from about 1400° C. to about 1750° C., from about 1400° C. to about 1725° C., from about 1400° C. to about 1700° C., from about 1400° C. to about 1675° C., from about 1400° C. to about 1650° C. and all ranges and sub-ranges therebetween.

A second aspect of the present disclosure pertains to glass articles that include the glass compositions described herein. In one or more embodiments, the glass article can be made by using a variety of processes including float processes and down-draw processes such as fusion draw and slot draw.

Float processes generally form glass articles by shaping molten glass composition poured onto a liquid metal (e.g., tin) in a reducing atmosphere. Float glass process installations usually include a melt tank, in which the glass composition is melted and refined and an interface responsible for the transition from the oxidic atmosphere in the melting tank to the reducing atmosphere in a downstream part of the installation, in which the glass composition is shaped on the liquid metal. The molten glass composition is poured onto the surface of the liquid tin bath and forms a floating glass ribbon. The smooth flow of the liquid metal bath shapes the molten glass composition and thus the glass article. As the glass ribbon flows along the tin bath, the temperature is gradually decreased until the glass ribbon solidifies into a solid glass article. In some instances, rollers may be used to exert a force on the molten glass composition surface. The solid glass article is typically transferred to be further cooled. Often, the resulting glass article has a flat shape. Glass articles formed by the float glass process may be characterized by smooth surfaces and uniform thickness Down-draw processes produce glass articles having a uniform thickness that may possess relatively pristine surfaces. Because the average flexural strength of the glass article is controlled by the amount and size of surface flaws, a pristine surface that has had minimal contact has a higher initial strength. When this high strength glass article is then further strengthened (e.g., chemically), the resultant strength can be higher than that of a glass article with a surface that has been lapped and polished. Down-drawn glass articles may be drawn to a thickness of less than about 2 mm. In addition, down drawn glass articles may have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous article and into an annealing region.

Once formed, the glass article (whether formed by a float process or down draw process) may be strengthened to form strengthened glass articles. As used herein, the term "strengthened glass article" may refer to a glass article that has been chemically strengthened, for example through ion-exchange of larger ions for smaller ions in the surface of the glass article. In some embodiments, other strengthening methods known in the art, such as thermal tempering, or utilizing a mismatch of the coefficient of thermal expansion between portions of the glass article to create compressive stress and central tension regions, may be utilized to form strengthened glass articles.

In the ion exchange process used to chemically strengthen one or more embodiments of the glass articles, ions in the surface layer of the glass article are replaced by—or exchanged with—larger ions having the same valence or oxidation state. In those embodiments, ions in the surface layer of the glass article and the larger ions are monovalent alkali metal cations, such as Li+ (when present in the glass), Na+, K+, Rb+, and Cs+. Alternatively, monovalent cations in the surface of the glass article may be replaced with monovalent cations other than alkali metal cations, such as Ag+ or the like.

Ion exchange processes are typically carried out by immersing a glass article in a molten salt bath containing the larger ions to be exchanged with the smaller ions in the glass article. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass article and the desired depth of layer and compressive stress of the glass article that result from the strengthening operation. By way of example, ion exchange of the glass articles described herein may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass articles are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass articles are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass articles are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

As mentioned herein, the degree of strengthening of the glass may be quantified based on the parameters of central tension CT, compressive stress CS and depth of layer DOL. The central tension CT, which is computed for the inner region adjacent the compressive stress layer within a glass article, can be calculated from the compressive stress CS, the thickness t, and the DOL. Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass article. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and central tension CT is given by the expression (1):

$$CT=(CS\cdot DOL)/(t-2\ DOL) \qquad (1),$$

wherein t is the thickness, expressed in microns (μm), of the glass article. In various sections of the disclosure, central tension CT and compressive stress CS are expressed herein in megaPascals (MPa), thickness t is expressed in either microns (μm) or millimeters (mm) and depth of layer DOL is expressed in microns (μm).

In one embodiment, a strengthened glass article can have a surface or average compressive stress of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass article may have a compressive depth of layer of 10 μm or greater, 15 μm or greater, 20 μm or greater (e.g., 25 μm, 30 μm, 35 μm, 40 μm, 45 μm, 50 μm or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass article has one or more of the following: a compressive stress greater than 500 MPa or 700 MPa or greater, a depth of compressive layer (extending from the surface of the glass article into the glass article) greater than 15 μm or 30 μm or greater, and a central tension greater than 18 MPa.

In one variant, the strengthened glass article includes a CS of 700 MPa or greater (e.g., 775 MPa, 800 MPa, 825 MPa, 850 MPa, 900 MPa etc.) and a DOL extending from a surface of the glass article into the glass article of about 30 μm or greater (e.g., 32 μm, 34 μm, 36 μm, 38 μm, 40 μm, 42 μm, 44 μm, 46 μm, 48 μm, 50 μm or greater). In one or more specific embodiments, the compressive stress layer is formed by ion exchanging the strengthened glass article for about 4 hours or less, 3 hours or less, or even 2 hours or less.

In another variant, the strengthened glass article includes a CS of 650 MPa or greater (e.g., 675 MPa, 700 MPa, 725 MPa, 750 MPa, 775 MPa, 800 MPa) and a DOL extending from the surface of the glass article into the glass article of about 40 μm or greater (e.g., 42 μm, 44 μm, 46 μm, 48 μm, 50 μm, 52 μm, 54 μm, 56 μm, 58 μm, 60 μm or greater). In one or more specific embodiments, the compressive stress layer is formed by ion exchanging the glass article for about 8 hours or less, about 7 hours or less, about 6 hours or less or even 5 hours or less.

In yet another variant, the strengthened glass articles includes a CS of 650 MPa or greater (e.g., 675 MPa, 700 MPa, 725 MPa, 750 MPa, 775 MPa, 800 MPa) and a DOL extending from a surface of the glass article into the glass article of about 50 μm or greater (e.g., 52 μm, 54 μm, 56 μm, 58 μm, 60 μm, 62 μm, 64 μm, 66 μm, 68 μm, 70 μm or greater) or greater). In one or more specific embodiments, the compressive stress layer is formed by ion exchanging the glass article for less than about 16 hours, 15 hours or less, 14 hours or less, 13 hours or less or even 12 hours or less.

In one or more embodiments, the glass articles exhibit a Vickers indentation crack initiation load of at least 8 kgf. In one variant, the glass articles exhibit a Vickers indentation crack initiation load of at least 9 kgf, 10 kgf, 11 kgf, 12 kgf, 13 kgf, 14 kgf, 15 kgf, 16 kgf, 17 kgf, 18 kgf, 19 kgf or 20 kgf and all ranges and sub-ranges therebetween. In some embodiments, the Vickers indentation crack initiation load may be in the range from about 8 kgf to about 20 kgf, from about 9 kgf to about 20 kgf, from about 10 kgf to about 20 kgf, from about 11 kgf to about 20 kgf, from about 12 kgf to about 20 kgf, from about 13 kgf to about 20 kgf, from about 14 kgf to about 20 kgf, from about 8 kgf to about 19 kgf, from about 8 kgf to about 18 kgf, from about 8 kgf to about 17 kgf, from about 8 kgf to about 16 kgf, from about 8 kgf to about 15 kgf, from about 8 kgf to about 14 kgf and all ranges and sub-ranges therebetween.

The glass article according to one or more embodiments can have a thickness ranging from about 100 μm to 5 mm. Exemplary glass article thicknesses range from 100 μm to 500 μm, e.g., 100 μm, 200 μm, 300 μm, 400 μm or 500 μm. Further exemplary glass article thicknesses range from 500 μm to 1000 μm, e.g., 500 μm, 600 μm, 700 μm, 800 μm, 900 μm or 1000 μm. Optionally, the glass article may have a thickness greater than 1 mm, e.g., about 2, 3, 4, or 5 mm. In one or more specific embodiments, the glass article may have a thickness of 2 mm or less or less than 1 mm.

Figure 2:
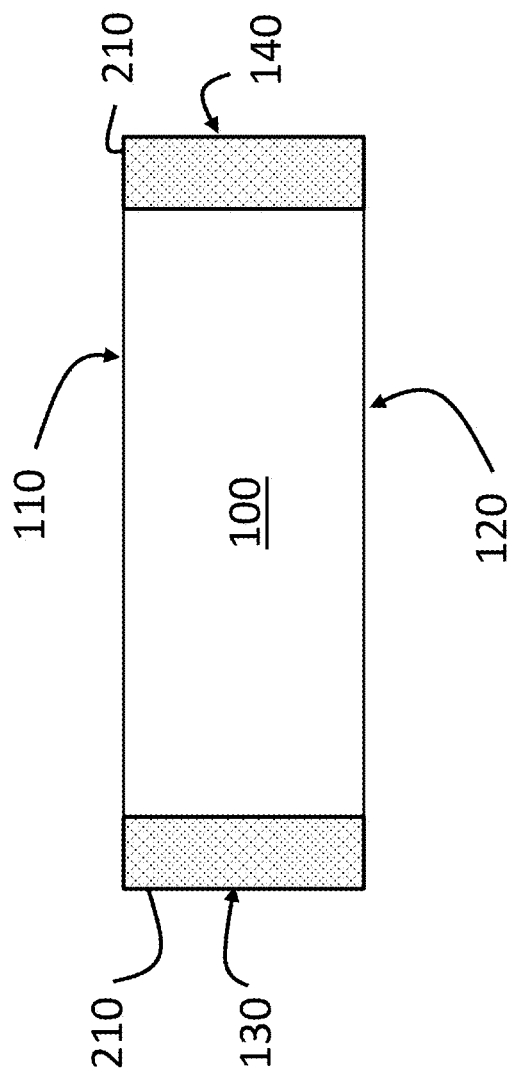
FIG. 2 shows a side view of a glass article according to one or more embodiments.
Figure 3:
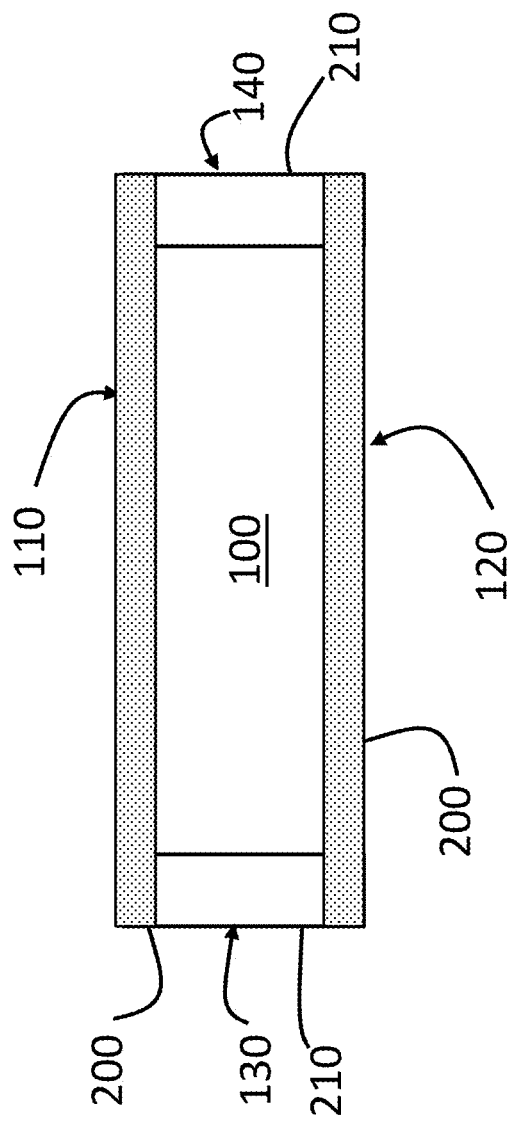
FIG. 3 shows a side view of a glass article according to one or more embodiments.

In one or more embodiments, the glass articles may include a layer that includes the glass compositions described herein. In a specific embodiment, the layer is integral to the glass article and/or may be characterized as a surface layer of the glass article. The remainder of the glass article may have a different composition from the surface layer. A surface layer may be present on one or more surfaces of the glass article. For example, as shown in FIG. 1, where the glass article 100 is in the shape of a glass sheet, a surface layer 200 may be present on one or both major surfaces (110, 120) of the glass article. Alternatively, as shown in FIG. 2, the surface layer 210 may be present on one or both minor surfaces (130, 140) of the glass article. As shown in FIG. 3, all surfaces of the glass article may include a surface layer 200, 210. In one or more embodiments, the surface layer may have a thickness of at least 100 nm that extends from at least one surface (110, 120, 130, 140) of the glass article into the glass article. In some embodiments, the thickness of the surface layer may be at least about 10 nm, at least about 120 nm, at least about 130 nm, at least about 140 nm, at least about 150 nm, at least about 160 nm, at least about 170 nm, at least about 180 nm, at least about 190 nm, at least about 200 nm, at least about 250 nm, at least about 300 nm, at least about 350 nm, at least about 400 nm, at least about 500 nm, at least about 600 nm, at least about 700 nm, at least about 800 nm, at least about 900 nm, at least about 1 μm, and all ranges and sub-ranges therebetween.

The thickness of a surface layer 200 may be the same on every surface on which it is disposed in the glass article (e.g., FIGS. 1 and 2) or the thickness of a surface layer 210 may differ from the thicknesses of other surface layers 200 other surfaces of the glass article (as shown in FIG. 3). In one or more embodiments, the surface layer of the glass article may be chemically strengthened, as described herein. In one or more specific embodiments, the surface layer and other portions of the glass article may be chemically strengthened as described herein.

A third aspect of the present disclosure pertains to a method of forming a glass article. In one or more embodiments, the method includes melting a batch including a glass composition, as otherwise described herein, and forming a glass article with the molten batch via a down draw process (e.g., fusion process or slot draw process) or a float process. In one or more embodiments, the method further includes strengthening the glass article by subjecting the glass article to an ion exchange treatment to form a strengthened glass article. In one or more embodiments, method includes subjecting the glass article to an ion exchange treatment is less than 16 hours. In a specific embodiment, the resulting strengthened glass article exhibits a CS of at least about 700 MPa, measured along the thickness of the compressive stress layer. In another specific embodiment, the strengthened glass article includes a compressive stress layer that extends from a surface of the glass article into the glass article at a depth of layer of at least about 50 μm.

Characterization of Glass Compositions and Glass Articles (which May be Ion Exchanged)

Viscosity of the glass compositions according to aspects and/or embodiments of this disclosure can be by methods known to those in the art, such as, those described in ASTM C965-96 (and its progeny, all herein incorporated by reference) "Standard Practice for Measuring Viscosity of Glass Above the Softening Point;" ASTM C1351M-96 (and its progeny, all herein incorporated by reference) "Standard Test Method for Measurement of Viscosity of Glass Between 10E4 Pa·s and 10E8 Pa·s by Viscous Compression of a Solid Right Cylinder;" and ASTM C1350M-96 (and its progeny, all herein incorporated by reference) "Standard Practice for Measuring Viscosity of Glass Between Softening Point and Annealing Range (Approximately 10E8 Pa·s to Approximately 10E13 Pa·s)," ASTM International, Conshohocken, Pa., US.

Annealing point and strain point of the glass compositions according to aspects and/or embodiments of this disclosure can be by methods known to those in the art, such as, those described in ASTM C598 (and its progeny, all herein incorporated by reference) "Standard Test Method for Annealing Point and Strain Point of Glass by Beam Bending," ASTM International, Conshohocken, Pa., US.

Elemental profiles measured for characterizing surfaces of glass articles according to aspects and/or embodiments of this disclosure were determined by analytical techniques know to those in the art, such as, electron microprobe (EMP); x-ray photoluminescence spectroscopy (XPS); secondary ion mass spectroscopy (SIMS) . . . etc.

Compressive stress ($\sigma_s$) in a surface layer, average surface compression (CSavg), and depth of layer (DOL) of ion exchanged glass articles can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan (see e.g., FSM-30 Surface Stress Meter Brochure, Cat no. FS-0013E at http://www.orihara-ss.co.jp/catalog/fsm/fsm-30-Ecat.pdf; FSM-60 Surface Stress Meter Brochure, Cat no. FS-0013E at http://www.luceo.co.jp/english/pdf/FSM-60LE %20Ecat.pdf; FSM-6000LE Surface Stress Meter Brochure, Revision 2009.04 at http://www.luceo.co.jp/english/pdf/FSM-6000LE %20Ecat.pdf; FSM-7000H Surface Stress Meter Brochure, Cat no. FS-0024 2009.08 at http://www.luceo.co.jp/catalog/catalog-pdf/FSM-7000H_cat.pdf; T. Kishii, "Surface Stress Meters Utilising the Optical Waveguide Effect of Chemically Tempered Glasses," Optics & Lasers in Engineering 4 (1983) pp. 25-38 at http://www.orihara-ss.co.jp/data/literature01/A034.pdf; and K. Kobayashi et al., "Chemical Strengthening of Glass and Industrial Application," 昭和 52 年 (1977) [52 (1977)], pp. 109-112 at http://www.orihara-ss.co.jp/data/literature01/A001.pdf, all of which are incorporated by reference herein).

Young's Modulus, Shear Modulus, and Poisson's Ratio of glass compositions according to aspects and/or embodiments of this disclosure can be characterized by methods known to those in the art, such as, those described in ASTM C1259 (and its progeny, all herein incorporated by reference) "Standard Test Method for Dynamic Young's Modulus, Shear Modulus, and Poisson's Ratio for Advanced Ceramics by Impulse Excitation of Vibration," ASTM International, Conshohocken, Pa., US.

Coefficient of thermal expansion (CTE) of glass compositions and glass articles according to aspects and/or embodiments of this disclosure can be characterized by methods known to those in the art, such as, those described in ASTM E228 (and its progeny, all herein incorporated by reference) Standard Test Method for Linear Thermal Expansion of Solid Materials with a Push-Rod Dilatometer," ASTM International, Conshohocken, Pa., US.

EXAMPLES

Various embodiments will be further clarified by the following examples, which are in no way intended to limit this disclosure thereto.

Inasmuch as the sum of the individual constituents totals or very closely approximates 100, for all practical purposes the reported values may be deemed to represent mole %. The actual glass compositions batch ingredients may comprise any materials, either oxides, or other compounds, which, when melted together with the other batch components, will be converted into the desired oxide in the proper proportions.

Examples 1-20

The exemplary glass compositions 1-20 listed in Table I were made in a platinum crucible using a batch of raw materials. Each crucible containing a formulated raw materials batch was placed in a furnace preheated to 1575° C.-1650° C., the formulated raw materials batch melted and refined to produce molten glass compositions.

TABLE I

Table I: Glass compositions.

| Oxide [mole %] | Example | | | | |
| --- | --- | --- | --- | --- | --- |
| | 1 | 2 | 3 | 4 | 5 |
| $Al_2O_3$ | 9.27 | 9.37 | 9.61 | 9.81 | 9.92 |
| $Na_2O$ | 15.09 | 15.40 | 15.40 | 15.34 | 15.35 |
| $SiO_2$ | 71.75 | 72.22 | 71.90 | 71.37 | 71.13 |
| $P_2O_5$ | 0.00 | 0.00 | 0.00 | 0.32 | 0.42 |
| MgO | 3.73 | 2.89 | 2.96 | 3.03 | 3.04 |
| $B_2O_3$ | 0.00 | 0.00 | 0.00 | 0.00 | 0.00 |
| $Li_2O$ | 0.00 | 0.00 | 0.00 | 0.00 | 0.00 |

TABLE I-continued

| Table I: Glass compositions. | | | | | |
|---|---|---|---|---|---|
| K$_2$O | 0.00 | 0.00 | 0.00 | 0.00 | 0.00 |
| CaO | 0.00 | 0.00 | 0.00 | 0.00 | 0.00 |
| ZnO | 0.00 | 0.00 | 0.00 | 0.00 | 0.00 |
| BaO | 0.00 | 0.00 | 0.00 | 0.00 | 0.00 |
| Fe$_2$O$_3$ | 0.00 | 0.00 | 0.00 | 0.00 | 0.00 |
| ZrO$_2$ | 0.00 | 0.00 | 0.00 | 0.00 | 0.00 |
| SnO$_2$ | 0.00 | 0.00 | 0.00 | 0.00 | 0.00 |
| MgO + CaO + ZnO | 3.73 | 2.89 | 2.96 | 3.03 | 3.04 |
| Anneal Pt (C.): | 615 | 603 | 609 | 616 | 619 |
| Strain Pt (C.): | 562 | 551 | 557 | 563 | 566 |
| Softening Pt (C.): | 869.6 | 857.3 | 861.7 | 871.4 | 875.7 |
| Density (g/cm$^3$): | | | | | |
| CTE ($\times 10^{-7}$/C.): | | | | | |
| Poisson's Ratio: | 0.204 | 0.212 | 0.209 | 0.209 | 0.214 |
| Shear Modulus (Mpsi): | 4.226 | 4.202 | 4.203 | 4.189 | 4.184 |
| Young's Modulus (Mpsi): | 10.18 | 10.183 | 10.164 | 10.134 | 10.156 |
| Stress optic coefficient | 30.27 | 30.17 | 30.27 | 30.29 | 30.27 |
| Liquidus temperature | | | | | |
| HTV -A | −1.883 | −2.318 | −2.452 | −2.465 | −2.592 |
| HTV -B | 6252 | 7455.8 | 7714 | 7748.4 | 8026.6 |
| HTV -T0 | 212.9 | 84.2 | 84.7 | 86.6 | 72.7 |
| Viscosity at 1300° C. (poise) | 7380.42 | 6522.64 | 7859.66 | 8330.92 | 8872.53 |
| 200 Poise temperature | 1707.15 | 1698.35 | 1707.66 | 1712.36 | 1713.12 |

| | Example | | | | |
|---|---|---|---|---|---|
| Oxide [mole %] | 6 | 7 | 8 | 9 | 10 |
| Al$_2$O$_3$ | 10.23 | 10.37 | 10.72 | 10.98 | 11 |
| Na$_2$O | 15.38 | 15.39 | 15.38 | 15.43 | 15 |
| SiO$_2$ | 70.46 | 70.15 | 69.59 | 69.06 | 74 |
| P$_2$O$_5$ | 0.65 | 0.83 | 1.05 | 1.28 | 0 |
| MgO | 3.10 | 3.08 | 3.09 | 3.07 | 0 |
| B$_2$O$_3$ | 0.00 | 0.00 | 0.00 | 0.00 | 0 |
| Li$_2$O | 0.00 | 0.00 | 0.00 | 0.00 | 0.00 |
| K$_2$O | 0.00 | 0.00 | 0.00 | 0.00 | 0.00 |
| CaO | 0.00 | 0.00 | 0.00 | 0.00 | 0.00 |
| ZnO | 0.00 | 0.00 | 0.00 | 0.00 | 0.00 |
| BaO | 0.00 | 0.00 | 0.00 | 0.00 | 0.00 |
| Fe$_2$O$_3$ | 0.00 | 0.00 | 0.00 | 0.00 | 0.00 |
| ZrO$_2$ | 0.00 | 0.00 | 0.00 | 0.00 | 0.00 |
| SnO$_2$ | 0.00 | 0.00 | 0.00 | 0.00 | 0.00 |
| MgO + CaO + ZnO | 3.10 | 3.08 | 3.09 | 3.07 | 0 |
| Anneal Pt (C.): | 626 | 631 | 635 | 640 | |
| Strain Pt (C.): | 573 | 576 | 580 | 586 | |
| Softening Pt (C.): | 883.6 | 892.3 | 899.4 | 906.9 | 934.2 |
| Density (g/cm$^3$): | | 2.412 | 2.413 | 2.413 | |
| CTE ($\times 10^{-7}$/C.): | | 81.4 | 82.7 | 81.8 | |
| Poisson's Ratio: | 0.222 | 0.209 | 0.217 | 0.205 | |
| Shear Modulus (Mpsi): | 4.171 | 4.155 | 4.168 | 4.179 | |
| Young's Modulus (Mpsi): | 10.193 | 10.047 | 10.147 | 10.072 | |
| Stress optic coefficient | 30.34 | 30.11 | 30.26 | 30.16 | |
| Liquidus temperature | | 985 | 1000 | 1000 | |
| HTV -A | −2.669 | −2.188 | −2.331 | −2.671 | −3.541 |
| HTV -B | 8182.7 | 6942.1 | 7211.8 | 7914.6 | 12243 |
| HTV -T0 | 57.6 | 177.4 | 154 | 123.4 | −192.4 |
| Viscosity at 1300° C. (poise) | 8264.26 | 9907.13 | 9162.61 | 11367.63 | 45980 |
| 200 Poise temperature | 1704.01 | 1723.86 | 1710.94 | 1715.22 | 1903 |

| | Example | | | | |
|---|---|---|---|---|---|
| Oxide [mole %] | 11 | 12 | 13 | 14 | 15 |
| Al$_2$O$_3$ | 8 | 8 | 7 | 8 | 7 |
| Na$_2$O | 15 | 15 | 15 | 14 | 13 |
| SiO$_2$ | 74 | 74 | 74 | 78 | 78 |
| P$_2$O$_5$ | 0 | 3 | 2 | 0 | 0 |
| MgO | 3 | 0 | 2 | 0 | 2 |
| B$_2$O$_3$ | 0 | 0 | 0 | 0 | 0 |
| Li$_2$O | 0 | 0 | 0 | 0 | 0 |
| K$_2$O | 0 | 0 | 0 | 0 | 0 |
| CaO | 0 | 0 | 0 | 0 | 0 |
| ZnO | 0 | 0 | 0 | 0 | 0 |
| BaO | 0 | 0 | 0 | 0 | 0 |
| Fe$_2$O$_3$ | 0 | 0 | 0 | 0 | 0 |
| ZrO$_2$ | 0 | 0 | 0 | 0 | 0 |
| SnO$_2$ | 0 | 0 | 0 | 0 | 0 |
| MgO + CaO + ZnO | 3 | 0 | 2 | 0 | 2 |

TABLE I-continued

Table I: Glass compositions.

| | | | | | |
|---|---|---|---|---|---|
| Anneal Pt (C.): | 600 | 629 | 591 | 527 | 547 |
| Strain Pt (C.): | 547 | 575 | 539 | 581 | 603 |
| Softening Pt (C.): | 855.2 | 629 | 883.3 | 843.8 | 881.4 |
| Density (g/cm$^3$): | | | | | |
| CTE (×10$^{-7}$/C.): | | | | | |
| Poisson's Ratio: | | | | 0.198 | |
| Shear Modulus (Mpsi): | | | | 4.165 | |
| Young's Modulus (Mpsi): | | | | 9.981 | |
| Stress optic coefficient | | | | | |
| Liquidus temperature | | | | | |
| HTV -A | | −2.784 | −0.791 | −2.084 | −2.327 |
| HTV -B | | 8862.5 | 4324.1 | 7029.4 | 8802.1 |
| HTV -T0 | | −6.5 | 407.2 | 118.3 | −58.7 |
| Viscosity at 1300° C. (poise) | | 9986 | 11280 | 7320 | 14169 |
| 200 Poise temperature | | 1736 | 1806 | 1721 | 1843 |

| | Example | | | | |
|---|---|---|---|---|---|
| Oxide [mole %] | 16 | 17 | 18 | 19 | 20 |
| Al$_2$O$_3$ | 10 | 8 | 8 | 8 | 7 |
| Na$_2$O | 16 | 15 | 15 | 16 | 15 |
| SiO$_2$ | 73.8 | 73.8 | 75.3 | 76.8 | 75.8 |
| P$_2$O$_5$ | 0 | 0 | 3 | 0 | 0 |
| MgO | 0 | 3 | 0 | 0 | 2 |
| B$_2$O$_3$ | 0 | 0 | 0 | 0 | 0 |
| Li$_2$O | 0 | 0 | 0 | 0 | 0 |
| K$_2$O | 0 | 0 | 0 | 0 | 0 |
| CaO | 0 | 0 | 0 | 0 | 0 |
| ZnO | 0 | 0 | 0 | 0 | 0 |
| BaO | 0 | 0 | 0 | 0 | 0 |
| Fe$_2$O$_3$ | 0 | 0 | 0 | 0 | 0 |
| ZrO$_2$ | 0 | 0 | 0 | 0 | 0 |
| SnO$_2$ | 0.2 | 0.2 | 0.2 | 0.2 | 0.2 |
| MgO + CaO + ZnO | 0 | 3 | 0 | 0 | 2 |
| Anneal Pt (C.): | | | | | |
| Strain Pt (C.): | | | | | |
| Softening Pt (C.): | 849.8 | 861.4 | 913.3 | 800.6 | 820.3 |
| Density (g/cm$^3$): | | | | | |
| CTE (×10$^{-7}$/C.): | | | | | |
| Poisson's Ratio: | 0.201 | 0.196 | 0.2 | 0.194 | 0.204 |
| Shear Modulus (Mpsi): | 4.232 | 4.228 | 4.054 | 4.193 | 4.202 |
| Young's Modulus (Mpsi): | 10.163 | 10.111 | 9.725 | 10.009 | 10.12 |
| Stress optic coefficient | | | | | |
| Liquidus temperature | | | | | |
| HTV -A | | | | | |
| HTV -B | | | | | |
| HTV -T0 | | | | | |
| Viscosity at 1300° C. (poise) | | | | | |
| 200 Poise temperature | | | | | |

The glass compositions listed in Table I were analyzed by X-ray Fluorescence (XRF). Anneal, strain and softening points were determined by fiber elongation. Density was determined by Buoyancy Method. Each coefficient of thermal expansion (CTE) value is the average value between room temperature and 300° C. Elastic modulus for each glass composition was determined by resonant ultrasound spectroscopy. Stress optic coefficient (SOC") values were determined by the diametral compression method. Liquidus temperature measurements were reported based on 72 hour testing.

Glass compositions 1-9 were formed into nine glass article samples each and subjected to ion exchange process by immersing the glass article samples in a salt bath, having a temperature of about 410° C., for a duration as shown in Table 2. The ion exchange properties of the glass article samples were determined using FSM measurement. Glass 13 and glasses 16 to 20 were fictivated into six glass article samples each at a higher temperature to simulate the fusion process. The glass article samples formed from glasses 13 and 16-20 were subjected to an ion exchange process in salt bath at 410° C. for 2 h, 4 h, 8 h and 16 h, as shown in Table 3. The compressive stress (CS) and depth of layer (DOL) of the glass articles were obtained as a result of treatment of fusion drawn (glass compositions 1 to 9) or fictivated (glass compositions 13 and glasses 16 to 20) samples in a salt bath including refined grade KNO$_3$. The CS and DOL of each glass article sample are recited in Tables 2 and 3 in the units of MPa and μm, respectively. For the glass article samples based on glass compositions 1 to 9, the CS and DOL are listed as average value, which were corrected to SOC and RI, where refractive index has been assumed as 1.5. For fictivated glass article samples based on glass compositions 13, 16 to 20, the CS and DOL are listed assuming SOC=31.8 and RI=1.5.

TABLE II

Table 2: Ion Exchange Properties of Glass Compositions 1-9.

| Example | 1 | 2 | 3 | 4 | 5 |
|---|---|---|---|---|---|
| CS (MPa) | 801.4 | 732.6 | 746.6 | 787.9 | 793.4 |
| DOL (μm) | 33.5 | 34.1 | 34.7 | 36.4 | 36.7 |
| Ion Exchange Time (hours) | 4 | 4 | 4 | 4 | 4 |
| CS (MPa) | 754.2 | 685.5 | 704.4 | 747.1 | 752.0 |
| DOL (μm) | 45.6 | 46.5 | 48.3 | 50 | 50.6 |
| Ion Exchange Time (hours) | 8 | 8 | 8 | 8 | 8 |
| CS (MPa) | 691.9 | 622.0 | 644.5 | 686.5 | 688.9 |
| DOL (μm) | 66.0 | 66.0 | 68.2 | 71.4 | 73.3 |
| Ion Exchange Time (hours) | 16 | 16 | 16 | 16 | 16 |

| Example | 6 | 7 | 8 | 9 |
|---|---|---|---|---|
| CS (MPa) | 806.6 | 844.9 | 864.5 | 878.2 |
| DOL (μm) | 38.4 | 30.1 | 31.4 | 32.6 |
| Ion Exchange Time (hours) | 4 | 2 | 2 | 2 |
| CS (MPa) | 759.5 | 808.1 | 832.8 | 854.1 |
| DOL (μm) | 53.5 | 40.7 | 42.3 | 44.2 |
| Ion Exchange Time (hours) | 8 | 4 | 4 | 4 |
| CS (MPa) | 698.4 | 785.8 | 810.7 | 830.0 |
| DOL (μm) | 77 | 53.6 | 56.8 | 57.9 |
| Ion Exchange Time (hours) | 16 | 8 | 8 | 8 |

TABLE III

| Example = | 13 | 16 | 17 | 18 | 19 | 20 |
|---|---|---|---|---|---|---|
| CS (MPa) | 483 | 571 | 611 | 554 | 447 | 482 |
| DOL (μm) | 42 | 36 | 35 | 48 | 34 | 33 |
| Ion Exchange Time (hours) | 4 | 4 | 4 | 4 | 4 | 4 |
| CS (MPa) | 462 | 528 | 575 | 524 | 409 | 443 |
| DOL (μm) | 57 | 50 | 47 | 67 | 46 | 44 |
| Ion Exchange Time (hours) | 8 | 8 | 8 | 8 | 8 | 8 |
| CS (MPa) | 430 | 488 | 530 | 491 | 369 | 404 |
| DOL (μm) | 81 | 71 | 67 | 97 | 66 | 62 |
| Ion Exchange Time (hours) | 16 | 16 | 16 | 16 | 16 | 16 |

Figure 4:
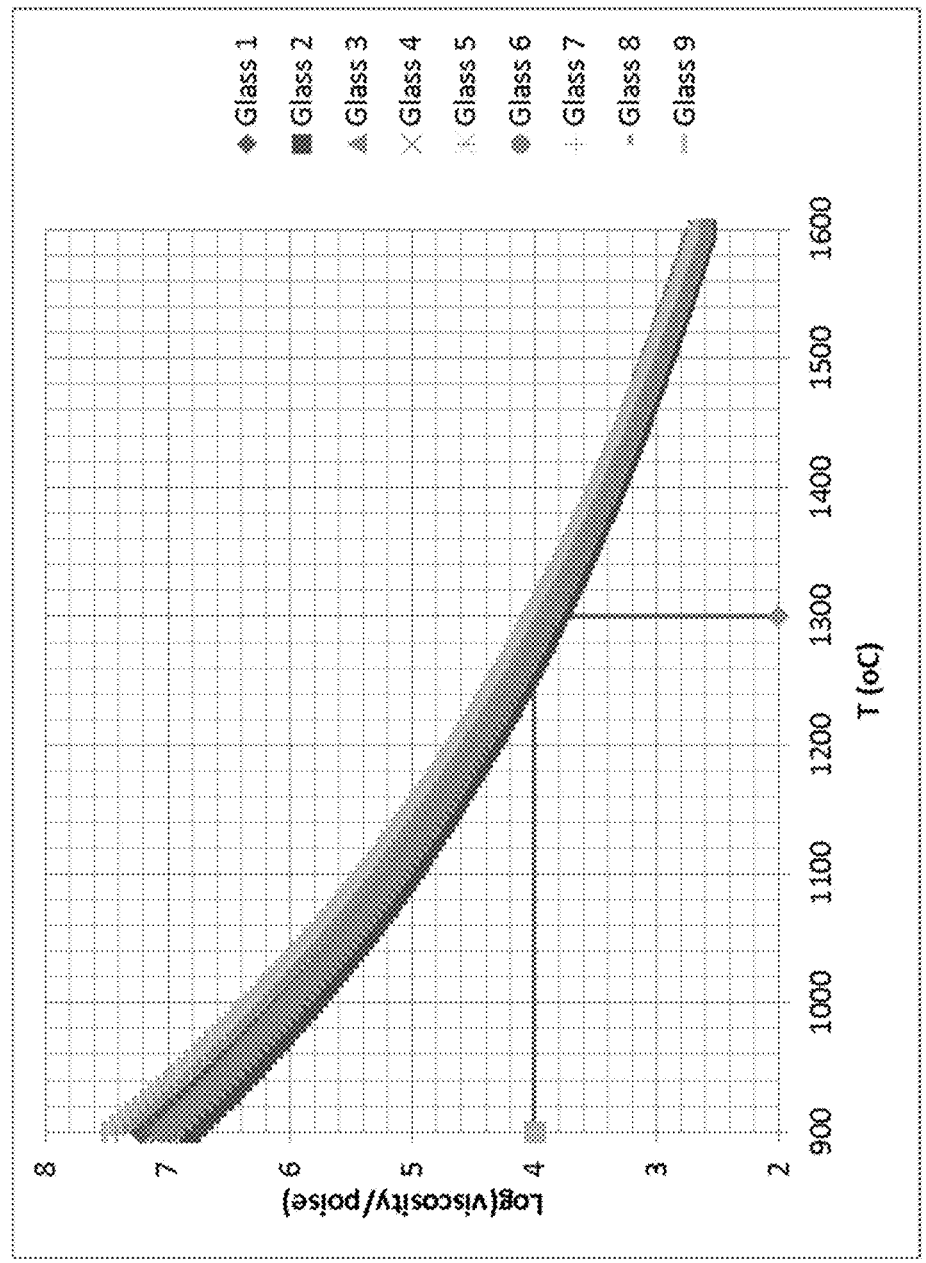
FIG. 4 is a plot of the viscosity at 1300° C. of glass compositions according to one or more embodiments.
Figure 5:
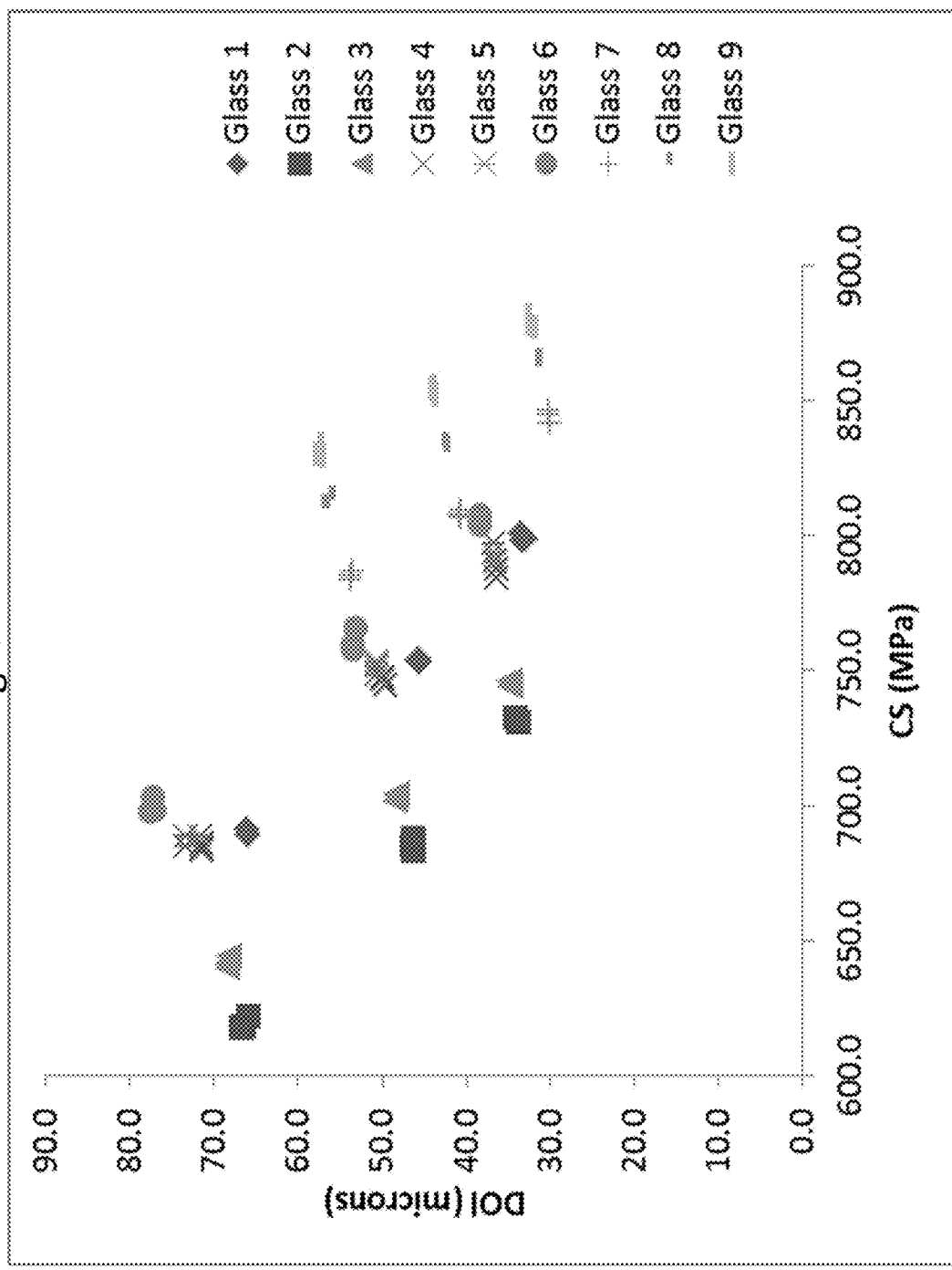
FIG. 5 is a plot of the compressive stress and depth of compressive stress layer (DOL) of chemically strengthened glass articles according to one or more embodiments.

The viscosity of glass compositions 1-9 at 1300° C. is shown in FIG. 4. FIG. 5 plots the CS and DOL after subjecting the glass articles formed from glass compositions 1-9 to identical ion exchange processes for the durations indicated.

Figure 6:
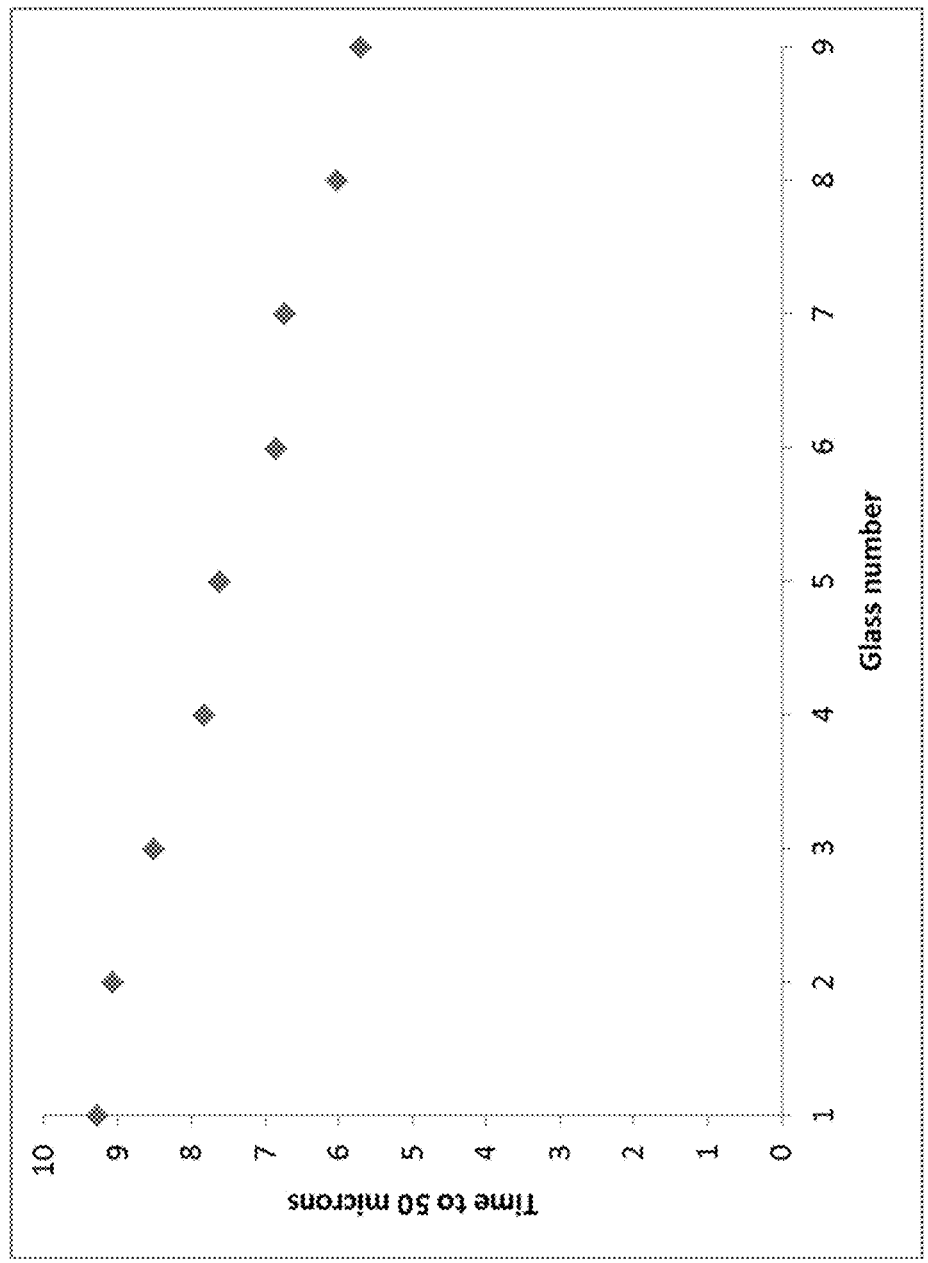
FIG. 6 is a plot showing the duration of the ion exchange process required to achieve a DOL of 50 µm in chemically strengthened glass articles according to one or more embodiments.
Figure 7:
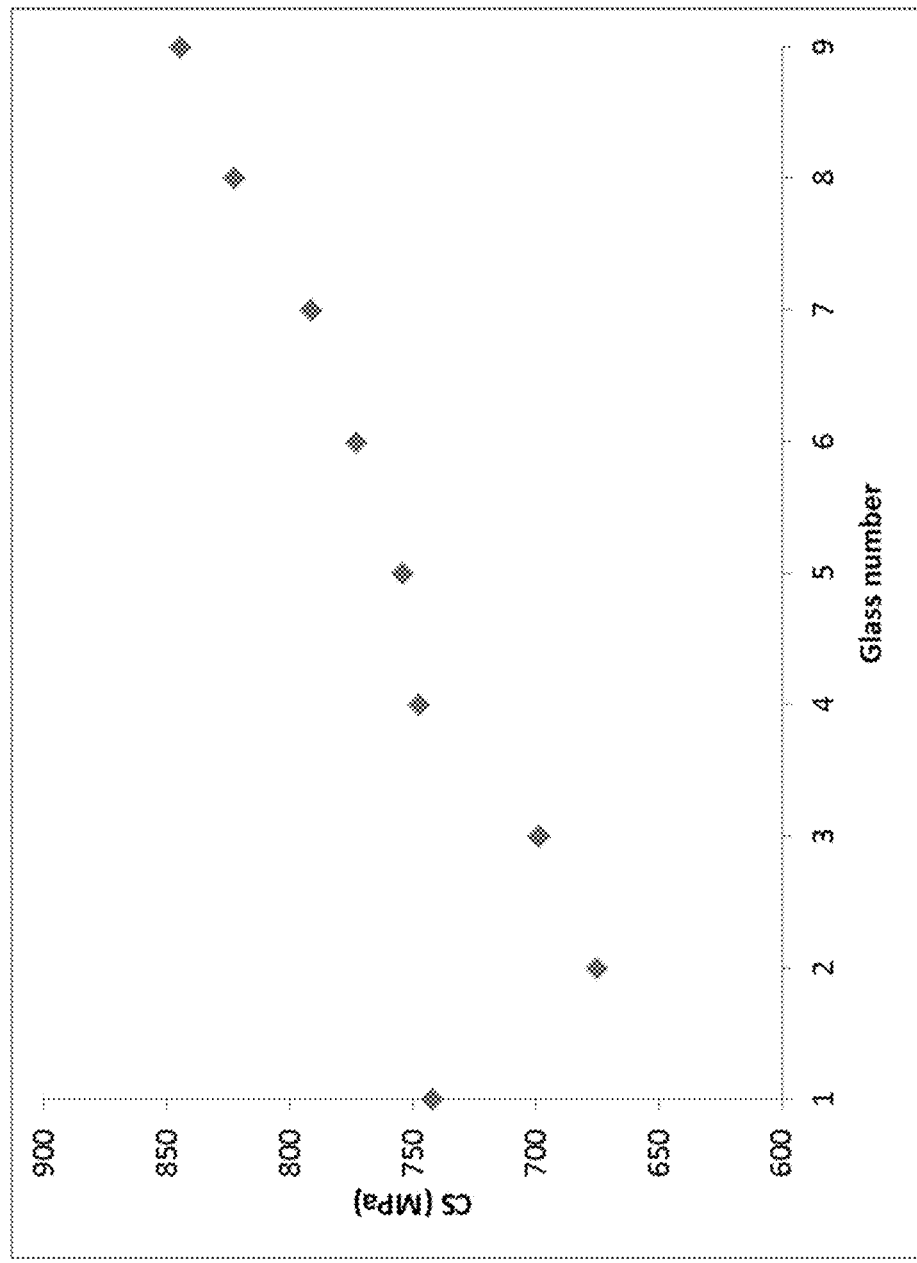
FIG. 7 is a plot showing the CS at a DOL of 50 µm of chemically strengthened glass articles according to one or more embodiments.
Figure 8:
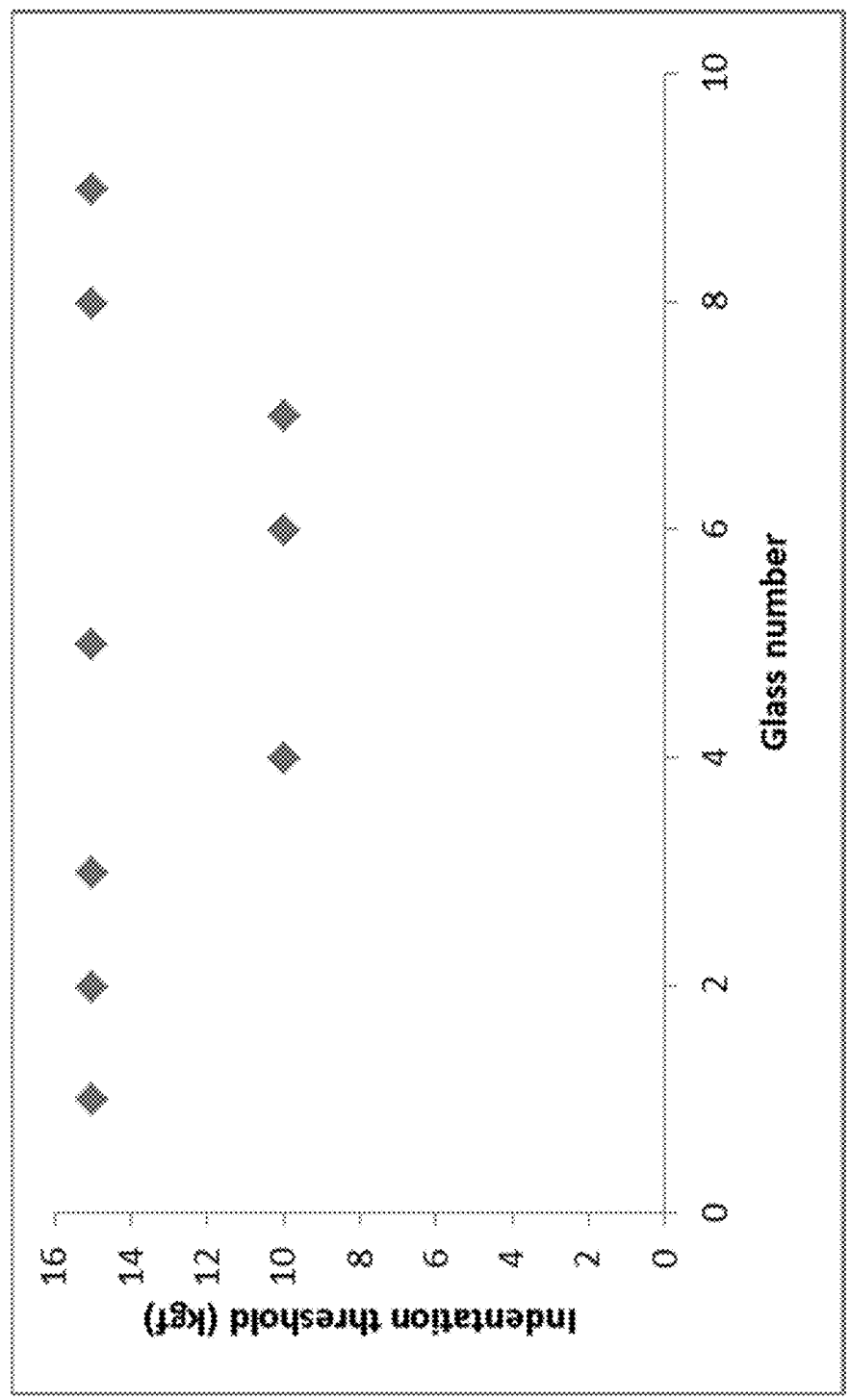
FIG. 8 is a plot showing the lower limit of the indentation fracture threshold for chemically strengthened glass articles according to one or more embodiments.

FIG. 6 shows the duration of the ion exchange process required to achieve a DOL of 50 μm for glass articles based on glass compositions 1-9. As shown in FIG. 6, all of the glass articles based on glass compositions 1-9 achieve a DOL of at least 50 μm in 10 hours or less. FIG. 7 shows the CS for the glass articles based on glass compositions 1-9 at a DOL of 50 μm. FIG. 8 illustrates the lower limit of the indentation fracture threshold for glass articles based on glass compositions 1-9. The indentation fracture threshold for the glass articles was measured after the glass articles based on glass compositions 1-6 were ion exchanged at 410° C. for 8 hours and after the glass articles based on glass compositions 7-9 were ion exchanged at 410° C. for 16 hours.

Examples 21-32

The exemplary glass compositions 21-32 listed in Table IV were made in a platinum crucible using a batch of raw materials. Each crucible containing a formulated raw materials batch was placed in a furnace preheated to from 1575° C.-1650° C., the formulated raw materials batch melted and refined to produce molten glass compositions.

TABLE IV

Glass compositions.

| Oxide [mole %] | Example | | | | | |
|---|---|---|---|---|---|---|
| | 21 | 22 | 23 | 24 | 25 | 26 |
| $SiO_2$ | 69.4 | 68.4 | 67.4 | 69.4 | 68.4 | 67.4 |
| $Al_2O_3$ | 11.2 | 11.2 | 11.2 | 11.2 | 11.2 | 11.2 |
| $Na_2O$ | 15 | 15 | 15 | 15 | 15 | 15 |
| $K_2O$ | 3 | 3 | 3 | 1 | 1 | 1 |
| MgO | 0.3 | 0.3 | 0.3 | 0.3 | 0.3 | 0.3 |
| ZnO | 0.3 | 0.3 | 0.3 | 0.3 | 0.3 | 0.3 |
| $P_2O_5$ | 0.6 | 1.6 | 2.6 | 2.6 | 3.6 | 4.6 |
| $SnO_2$ | 0.2 | 0.2 | 0.2 | 0.2 | 0.2 | 0.2 |
| MgO + CaO + ZnO | 0.6 | 0.6 | 0.6 | 0.6 | 0.6 | 0.6 |
| anneal pt | 581 | 597 | 631 | 653 | 665 | 659 |
| strain pt | 534 | 547 | 578 | 600 | 611 | 602 |
| soft pt | 828 | 864 | 895 | 915 | 917 | 914 |
| SOC | 29.09 | 29.25 | 29.47 | 30.34 | 30.43 | 30.58 |
| CS, IOX for 8 h in salt bth at 390° C. | 750 | 745 | 737 | 754 | 724 | 704 |
| DOL, IOX for 8 h in salt bth at 390° C. | 51 | 60 | 70 | 67 | 74 | 71 |
| CS, IOX for 16 h in $KNO_3$ salt bth at 390° C. | 704 | 710 | 695 | 717 | 675 | 638 |
| DOL, IOX for 16 h $KNO_3$ in salt bth at 390° C. | 71 | 80 | 97 | 93 | 102 | 114 |
| | 27 | 28 | 29 | 30 | 31 | 32 |
| $SiO_2$ | 69.4 | 69.4 | 69.4 | 69.4 | 69.4 | 69.4 |
| $Al_2O_3$ | 10.7 | 10.7 | 10.7 | 9.5 | 9.5 | 9.5 |
| $Na_2O$ | 16 | 15 | 13 | 13 | 15 | 14 |
| $K_2O$ | 2 | 2 | 2 | 2 | 1 | 1 |
| MgO | 0.5 | 0.5 | 0.5 | 0.5 | 0.5 | 0.5 |
| ZnO | 0.5 | 0.5 | 0.5 | 0.5 | 0.5 | 0.5 |
| $P_2O_5$ | 0.75 | 0.75 | 0.75 | 2 | 1 | 1 |
| $SnO_2$ | 0.2 | 0.2 | 0.2 | 0.2 | 0.2 | 0.2 |
| MgO + CaO + ZnO | 1 | 1 | 1 | 1 | 1 | 1 |
| anneal pt | 578 | 556 | 548 | 581 | 530 | 526 |
| strain pt | 530 | 508 | 502 | 532 | 483 | 480 |
| soft pt | 820 | 802 | 785 | 828 | 760 | 761 |
| SOC | 29.06 | 28.75 | 28.73 | 29.08 | 28.39 | 28.4 |
| CS, IOX for 16 h in $KNO_3$ salt bath at 390° C. | 670 | | | | | |
| DOL, IOX for 16 h in $KNO_3$ salt bath at 390° C. | 65 | | | | | |
| CS, IOX for 15 h in $KNO_3/NaNO_3$ salt bath at 410° C. | | 690 | 723 | 648 | 632 | 625 |
| DOL, IOX for 15 h in $KNO_3/NaNO_3$ salt bath at 410° C. | | 62 | 48 | 63 | 46 | 42 |

Glass compositions 21-32 were formed into twelve glass article samples each and subjected to ion exchange process by immersing the glass article samples in a salt bath. The salt bath utilized for the glass article samples formed from glass compositions 21-26 included $KNO_3$. The salt bath utilized for the glass article samples formed from glass compositions 27-32 included either a KNO$_3$ salt bath or a salt bath including 90:10 mixture of KNO$_3$ and NaNO$_3$, as shown in Table 4.

Examples 33-79

The exemplary glass compositions 33-79 listed in Table V were made in a platinum crucible using a batch of raw materials (shown as "batched mol %"). Each crucible containing a formulated raw materials batch was placed in a furnace preheated to 1575° C.-1650° C., the formulated raw materials batch melted and refined to produce molten glass compositions. The resulting glass compositions are shown as "Analyzed mol %" in Table V, along with other attributes. Glasses 33-79 were formed and subjected to ion exchange process by immersing the glass article samples in a salt bath of KNO$_3$, having a temperature of 410° C. for 1 hour. The measured CS and DOL measurements are also shown in Table V.

TABLE V

Glass compositions (batched and after formation).

| | Ex. 33 | Ex. 34 | Ex. 35 | Ex. 36 | Ex. 37 | Ex. 38 |
|---|---|---|---|---|---|---|
| Batched mol % | | | | | | |
| SiO$_2$ | 71.5 | 72 | 72.5 | 73 | 73.5 | 74 |
| Al$_2$O$_3$ | 9.6 | 9.6 | 9.6 | 9.6 | 9.6 | 9.6 |
| Na$_2$O | 15.9 | 15.4 | 14.9 | 14.4 | 13.9 | 13.4 |
| K$_2$O | | | | | | |
| MgO | 3 | 3 | 3 | 3 | 3 | 3 |
| CaO | | | | | | |
| SnO$_2$ | | | | | | |
| Analyzed mol % | | | | | | |
| Al$_2$O$_3$ | 9.56 | 9.49 | 9.64 | 9.78 | 9.70 | 9.79 |
| CaO | 0.04 | 0.04 | 0.04 | 0.04 | 0.04 | 0.04 |
| Cl | 0.04 | 0.04 | 0.03 | 0.03 | 0.04 | 0.03 |
| Fe$_2$O$_3$ | 0.01 | 0.01 | 0.01 | 0.01 | 0.01 | 0.01 |
| K$_2$O | 0.01 | 0.01 | 0.01 | 0.01 | 0.01 | 0.01 |
| MgO | 3.10 | 3.25 | 3.04 | 2.95 | 3.02 | 2.90 |
| Na$_2$O | 15.49 | 15.25 | 14.34 | 13.45 | 13.15 | 12.82 |
| SO$_3$ | | | | | | |
| SiO$_2$ | 71.74 | 71.92 | 72.88 | 73.73 | 74.04 | 74.40 |
| SnO$_2$ | | | | | | |
| SrO | | | | | | |
| ZnO | | | | | | |
| Fulchers | | | | | | |
| A | −2.442 | −2.367 | −2.576 | −2.849 | −2.628 | −2.81 |
| B | 7667.6 | 7564.6 | 8183 | 8848.6 | 8385 | 8895.2 |
| To | 72.6 | 90.4 | 75.1 | 40.2 | 105.8 | 81.3 |
| 200 | 1689 | 1711 | 1753 | 1758 | 1807 | 1822 |
| 35000 | 1170 | 1185 | 1224 | 1237 | 1275 | 1291 |
| 100000 | 1103 | 1117 | 1155 | 1168 | 1205 | 1220 |
| 160000 | 1075 | 1090 | 1127 | 1139 | 1176 | 1191 |
| 200000 | 1063 | 1077 | 1114 | 1126 | 1163 | 1178 |
| Density | 2.417 | 2.414 | 2.405 | 2.401 | 2.394 | 2.391 |
| Strain | 554 | 561 | 574 | 578 | 596 | 609 |
| Anneal | 605 | 614 | 629 | 633 | 654 | 668 |
| Softening | 848.3 | 863.3 | 887.9 | 897.4 | 928.9 | 951.6 |
| Expansion | 81.3 | 80.5 | 79.2 | 77.3 | 73.4 | 72.2 |
| 10^11 | 689 | 701 | 719 | 724 | 750 | 766 |
| SOC | 30.35 | 30.25 | | 30.86 | 31.14 | 31.33 |
| refractive index | 1.4971 | 1.4971 | | 1.4951 | 1.4937 | 1.4931 |
| CS (IOX at 410° C. 1 hr) (MPa) | 783 | 786 | | 830 | 822 | 807 |
| DOL (μm) | 19 | 19 | | 18 | 21 | 22 |
| CS (IOX at 410° C. 4 hrs) (MPa) | 683 | 702 | | 729 | 768 | 770 |
| DOL (μm) | 36 | 36 | | 38 | 39 | 40 |
| Liquidus Air | | | 1000 | 1010 | | |
| Liquidus Int | | | 990 | 1000 | | |
| Liquidus Pt | | | 980 | 980 | | |
| Phase | | | Albite | Albite | | |
| Zircon breakdown temp | | | >1265 | >1270 | | |

| | Ex. 39 | Ex. 40 | Ex. 41 | Ex. 42 | Ex. 43 | Ex. 44 |
|---|---|---|---|---|---|---|
| Batched mol % | | | | | | |
| SiO$_2$ | 72 | 72 | 72 | 72 | 72 | 72 |
| Al$_2$O$_3$ | 9 | 9 | 9 | 9 | 9 | 9 |
| Na$_2$O | 12.8 | 12.8 | 12.8 | 12.8 | 12.8 | 12.8 |
| K$_2$O | 2 | 3 | 3 | 2 | 1 | 1 |
| MgO | 2 | 2 | 1 | 3 | 3 | 2 |

TABLE V-continued

Glass compositions (batched and after formation).

|  |  |  |  |  |  |  |
|---|---|---|---|---|---|---|
| CaO | 2 | 1 | 2 | 1 | 2 | 3 |
| $SnO_2$ | 0.2 | 0.2 | 0.2 | 0.2 | 0.2 | 0.2 |
| Analyzed mol % |  |  |  |  |  |  |
| $Al_2O_3$ | 9.07 | 9.07 | 9.09 | 9.08 | 9.04 | 9.00 |
| CaO | 1.99 | 0.97 | 1.96 | 0.99 | 2.01 | 3.08 |
| Cl | 0.04 | 0.04 | 0.04 | 0.03 | 0.04 | 0.04 |
| $Fe_2O_3$ | 0.01 | 0.01 | 0.01 | 0.01 | 0.01 | 0.01 |
| $K_2O$ | 1.87 | 2.80 | 2.71 | 1.87 | 0.96 | 0.97 |
| MgO | 2.02 | 2.01 | 1.01 | 3.06 | 3.09 | 2.08 |
| $Na_2O$ | 12.35 | 12.48 | 12.14 | 12.37 | 12.40 | 12.54 |
| $SO_3$ | 0.00 | 0.00 | 0.01 | 0.00 | 0.00 | 0.01 |
| $SiO_2$ | 72.45 | 72.42 | 72.84 | 72.40 | 72.25 | 72.09 |
| $SnO_2$ | 0.20 | 0.19 | 0.19 | 0.20 | 0.19 | 0.19 |
| SrO |  |  |  |  |  |  |
| ZnO |  |  |  |  |  |  |
| Fulchers |  |  |  |  |  |  |
| A | −2.474 | −2.353 | −2.193 | −2.238 | −2.305 | −2.273 |
| B | 7846.3 | 7755.1 | 7353.6 | 7297.5 | 7302.8 | 7240 |
| To | 59.2 | 42.2 | 70.6 | 123.8 | 131 | 116 |
| 200 | 1702 | 1709 | 1707 | 1732 | 1716 | 1699 |
| 35000 | 1177 | 1167 | 1162 | 1200 | 1197 | 1178 |
| 100000 | 1109 | 1097 | 1093 | 1132 | 1131 | 1111 |
| 160000 | 1081 | 1068 | 1065 | 1104 | 1104 | 1084 |
| 200000 | 1068 | 1055 | 1052 | 1092 | 1091 | 1072 |
| Density | 2.431 | 2.428 | 2.432 | 2.424 | 2.429 | 2.437 |
| Strain | 554 | 536 | 538 | 562 | 576 | 566 |
| Anneal | 605 | 587 | 588 | 614 | 628 | 617 |
| Softening | 851.7 | 833.9 | 829.7 | 870 | 880.3 | 860.2 |
| Expansion | 81.5 | 85.3 | 84.1 | 80.8 | 76.9 | 78.6 |
| $10^{\wedge}11$ | 690 | 672 | 671 | 701 | 715 | 701 |
| SOC | 30.24 | 30.14 | 30.06 | 30.5 | 30.59 | 30.18 |
| refractive index | 1.5006 | 1.4992 | 1.5003 | 1.4989 | 1.5004 | 1.5026 |
| CS (IOX at 410° C. 1 hr) (MPa) | 726 | 650 | 647 | 733 | 791 | 771 |
| DOL (µm) | 18 | 21 | 20 | 19 | 14 | 12 |
| CS (IOX at 410° C. 4 hrs)(MPa) | 687 | 615 | 610 | 708 | 768 | 750 |
| DOL (µm) | 36 | 44 | 38 | 40 | 30 | 27 |
| Liquidus Air |  |  |  | 935 | 1000 |  |
| Liquidus Int |  |  |  | 930 | 990 |  |
| Liquidus Pt |  |  |  | 900 | 985 |  |
| Phase |  |  |  | Albite | Forsterite |  |
| Zircon breakdown temp |  |  |  | 1255 | 1275 |  |

|  | Ex. 45 | Ex. 46 | Ex. 47 | Ex. 48 | Ex. 49 | Ex. 50 |
|---|---|---|---|---|---|---|
| Batched mol % |  |  |  |  |  |  |
| $SiO_2$ | 72 | 72 | 72 | 72 | 72 | 72 |
| $Al_2O_3$ | 9 | 10 | 10 | 10 | 10 | 10 |
| $Na_2O$ | 12.8 | 12.8 | 12.8 | 12.8 | 12.8 | 12.8 |
| $K_2O$ | 2 | 2 | 2 | 2 | 3 | 1 |
| MgO | 1 | 2 | 1 | 2 | 1 | 3 |
| CaO | 3 | 1 | 2 | 1 | 1 | 1 |
| $SnO_2$ | 0.2 | 0.2 | 0.2 | 0.2 | 0.2 | 0.2 |
| Analyzed mol % |  |  |  |  |  |  |
| $Al_2O_3$ | 9.04 | 9.99 | 10.02 | 10.03 | 10.07 | 10.01 |
| CaO | 3.04 | 1.00 | 2.04 | 1.01 | 1.01 | 1.00 |
| Cl | 0.04 | 0.04 | 0.04 | 0.04 | 0.04 | 0.03 |
| $Fe_2O_3$ | 0.01 | 0.01 | 0.01 | 0.01 | 0.01 | 0.01 |
| $K_2O$ | 1.90 | 1.91 | 1.91 | 1.92 | 2.85 | 0.97 |
| MgO | 1.02 | 2.08 | 1.05 | 2.08 | 1.05 | 3.09 |
| $Na_2O$ | 12.43 | 12.52 | 12.47 | 12.50 | 12.50 | 12.57 |
| $SO_3$ | 0.01 | 0.00 | 0.01 | 0.00 | 0.00 | 0.00 |
| $SiO_2$ | 72.33 | 72.25 | 72.27 | 72.22 | 72.28 | 72.13 |
| $SnO_2$ | 0.20 | 0.19 | 0.19 | 0.19 | 0.20 | 0.19 |
| SrO |  |  |  |  |  |  |
| ZnO |  |  |  |  |  |  |
| Fulchers |  |  |  |  |  |  |
| A | −2.156 | −2.691 | −2.316 | −2.547 | −2.446 | −2.909 |
| B | 7116 | 8590.2 | 7713.2 | 8226.5 | 8219.5 | 8769.9 |
| To | 91.7 | 32 | 73.5 | 60.7 | 15.1 | 65.4 |
| 200 | 1688 | 1753 | 1744 | 1758 | 1747 | 1749 |

TABLE V-continued

Glass compositions (batched and after formation).

|  |  |  |  |  |  |  |
|---|---|---|---|---|---|---|
| 35000 | 1154 | 1219 | 1198 | 1221 | 1191 | 1242 |
| 100000 | 1086 | 1149 | 1128 | 1151 | 1119 | 1174 |
| 160000 | 1059 | 1120 | 1099 | 1122 | 1090 | 1146 |
| 200000 | 1046 | 1107 | 1086 | 1109 | 1076 | 1134 |
| Density | 2.441 | 2.425 | 2.432 | 2.425 | 2.428 | 2.422 |
| Strain | 549 | 565 | 559 | 565 | 544 | 591 |
| Anneal | 599 | 619 | 611 | 618 | 595 | 646 |
| Softening | 836 | 880.6 | 859.9 | 879.5 | 850.1 | 913 |
| Expansion | 82 | 82.1 | 81.8 | 82.2 | 84.1 | 78.2 |
| 10^11 | 681 | 709 | 697 | 707 | 681 | 738 |
| SOC | 29.79 | 30.61 | 30.55 | 30.51 | 30.37 | 30.82 |
| refractive index | 1.5028 | 1.4987 | 1.5004 | 1.4961 | 1.499 | 1.4992 |
| CS (IOX at 410° C. 1 hr) (MPa) | 707 | 756 | 735 | 787 | 675 | 842 |
| DOL (μm) | 15 | 19 | 18 | 19 | 21 | 17 |
| CS (IOX at 410° C. 4 hrs) (MPa) | 666 | 725 | 697 |  | 626 | 811 |
| DOL (μm) | 31 | 41 | 38 |  | 45 | 39 |
| Liquidus Air |  |  |  | 965 |  | 990 |
| Liquidus Int |  |  |  | 955 |  | 985 |
| Liquidus Pt |  |  |  | 950 |  | 985 |
| Phase |  |  |  | Albite |  | Albite |
| Zircon breakdown temp |  |  |  | 1230 |  | 1265 |

|  | Ex. 51 | Ex. 52 | Ex. 53 | Ex. 54 | Ex. 55 | Ex. 56 |
|---|---|---|---|---|---|---|
| Batched mol % |  |  |  |  |  |  |
| SiO$_2$ | 73 | 73 | 73 | 72 | 72 | 72 |
| Al$_2$O$_3$ | 10 | 10 | 10 | 9 | 9 | 9 |
| Na$_2$O | 13.2 | 12.2 | 11.2 | 13.8 | 14.8 | 14.8 |
| K$_2$O | 2 | 3 | 4 | 3 | 2 | 3 |
| MgO |  |  |  |  |  |  |
| CaO | 1.6 | 1.6 | 1.6 | 2 | 2 | 1 |
| SnO$_2$ | 0.2 | 0.2 | 0.2 | 0.2 | 0.2 | 0.2 |
| Analyzed mol % |  |  |  |  |  |  |
| Al$_2$O$_3$ | 9.95 | 9.94 | 9.97 | 9.16 | 9.05 | 9.84 |
| CaO | 1.61 | 1.61 | 1.61 | 1.91 | 2.00 | 0.96 |
| Cl | 0.04 | 0.03 | 0.03 | 0.04 | 0.04 | 0.04 |
| Fe$_2$O$_3$ | 0.01 | 0.01 | 0.01 | 0.01 | 0.01 | 0.01 |
| K$_2$O | 1.94 | 2.90 | 3.83 | 2.64 | 1.87 | 2.71 |
| MgO | 0.05 | 0.04 | 0.04 | 0.05 | 0.05 | 0.03 |
| Na$_2$O | 13.13 | 12.16 | 11.07 | 13.02 | 14.32 | 14.28 |
| SO$_3$ | 0.00 | 0.00 | 0.00 | 0.01 | 0.00 | 0.00 |
| SiO$_2$ | 73.08 | 73.10 | 73.24 | 72.96 | 72.45 | 72.13 |
| SnO$_2$ | 0.20 | 0.20 | 0.20 | 0.20 | 0.19 | 0.00 |
| SrO |  |  |  | 0.01 | 0.01 | 0.01 |
| ZnO |  |  |  |  |  |  |
| Fulchers |  |  |  |  |  |  |
| A | −2.159 | −2.299 | −2.3 | −2.085 | −1.968 | −2.261 |
| B | 7519.6 | 7929.8 | 8038.8 | 7176 | 6725.7 | 7651.1 |
| To | 47.4 | 20.5 | 17.4 | 52.9 | 84.4 | −3.7 |
| 200 | 1733 | 1744 | 1765 | 1689 | 1660 | 1673 |
| 35000 | 1169 | 1179 | 1192 | 1135 | 1117 | 1121 |
| 100000 | 1098 | 1107 | 1119 | 1066 | 1050 | 1050 |
| 160000 | 1069 | 1077 | 1089 | 1037 | 1022 | 1021 |
| 200000 | 1055 | 1064 | 1075 | 1024 | 1010 | 1008 |
| Density | 2.428 | 2.427 | 2.247 | 2.434 | 2.439 | 2.43 |
| Strain | 544 | 540 | 541 | 525 | 522 | 511 |
| Anneal | 596 | 592 | 593 | 574 | 569 | 559 |
| Softening | 839.1 | 838.3 | 846.3 | 808.5 | 795.5 | 793.8 |
| Expansion | 82.6 | 84.3 | 85.1 | 85.4 | 86.7 | 89.1 |
| 10^11 | 681 | 678 | 680 | 655 | 647 | 639 |
| SOC | 30.15 | 29.98 | 29.96 | 29.91 | 29.57 | 29.62 |
| refractive index | 1.4993 | 1.4991 | 1.4991 | 1.5005 | 1.5013 | 1.4995 |
| CS (IOX at 410° C. 1 hr) (MPa) | 673 | 632 | 596 | 614 | 648 | 597 |
| DOL (μm) | 20 | 25 | 25 | 22 | 18 | 23 |
| CS (IOX at 410° C. 4 hrs) (MH3a) | 625 | 590 | 560 | 564 | 586 | 535 |

TABLE V-continued

Glass compositions (batched and after formation).

| | | | | | | |
|---|---|---|---|---|---|---|
| DOL (μm) | 37 | 39 | 44 | 38 | 33 | 45 |
| Liquidus Air | | | | | | |
| Liquidus Int | | | | | | |
| Liquidus Pt | | | | | | |
| Phase | | | | | | |
| Zircon breakdown temp | | | | | | |

| | Ex. 57 | Ex. 58 | Ex. 59 | Ex. 60 | Ex. 61 | Ex. 62 |
|---|---|---|---|---|---|---|
| Batched mol % | | | | | | |
| $SiO_2$ | 72 | 72 | 72 | 73 | 73 | 73 |
| $Al_2O_3$ | 9 | 9 | 9 | 10 | 10 | 10 |
| $Na_2O$ | 12.8 | 12.8 | 13.8 | 11.7 | 11.2 | 10.7 |
| $K_2O$ | 4 | 3 | 4 | 3 | 3 | 3 |
| MgO | | | | | | |
| CaO | 2 | 3 | 1 | 2.1 | 2.6 | 3.1 |
| $SnO_2$ | 0.2 | 0.2 | 0.2 | 0.2 | 0.2 | 0.2 |
| Analyzed mol % | | | | | | |
| $Al_2O_3$ | 9.15 | 9.10 | 9.11 | 10.01 | 9.99 | 10.02 |
| CaO | 1.90 | 2.99 | 0.97 | 2.13 | 2.63 | 3.08 |
| Cl | 0.03 | 0.03 | 0.04 | 0.04 | 0.04 | 0.04 |
| $Fe_2O_3$ | 0.01 | 0.01 | 0.01 | 0.01 | 0.01 | 0.01 |
| $K_2O$ | 3.54 | 2.73 | 3.69 | 2.81 | 2.80 | 2.83 |
| MgO | 0.04 | 0.07 | 0.03 | 0.08 | 0.08 | 0.09 |
| $Na_2O$ | 12.14 | 12.23 | 13.32 | 11.38 | 10.85 | 10.44 |
| $SO_3$ | 0.01 | 0.01 | 0.01 | 0.00 | 0.00 | 0.00 |
| $SiO_2$ | 72.97 | 72.62 | 72.64 | 73.33 | 73.38 | 73.29 |
| $SnO_2$ | 0.20 | 0.20 | 0.20 | 0.19 | 0.19 | 0.19 |
| SrO | 0.01 | 0.01 | 0.01 | 0.01 | 0.01 | 0.01 |
| ZnO | | | | 0.01 | 0.02 | 0.00 |
| Fulchers | | | | | | |
| A | −2.209 | −2.136 | −2.192 | −2.386 | −2.367 | |
| B | 7482.7 | 7102.7 | 7387.8 | 8183.1 | 8049.8 | |
| To | 28.3 | 77.7 | 13.9 | 32.4 | 54.9 | |
| 200 | 1687 | 1678 | 1658 | 1778 | 1779 | |
| 35000 | 1136 | 1141 | 1111 | 1213 | 1220 | |
| 100000 | 1066 | 1073 | 1041 | 1140 | 1148 | |
| 160000 | 1038 | 1045 | 1013 | 1111 | 1118 | |
| 200000 | 1025 | 1033 | 1000 | 1097 | 1105 | |
| Density | 2.435 | 2.44 | 2.435 | 2.426 | 2.428 | 2.429 |
| Strain | 525 | 538 | 505 | 556 | 562 | 572 |
| Anneal | 573 | 586 | 552 | 608 | 615 | 626 |
| Softening | 806.5 | 817.8 | 785.1 | 862.5 | 872.9 | 880.6 |
| Expansion | 87.1 | 85.2 | 90 | 81.7 | 80.5 | 80.3 |
| 10^11 | 653 | 666 | 631 | 695 | 703 | 715 |
| SOC | 29.86 | 29.93 | 29.42 | 30.31 | 30.34 | 30.32 |
| refractive index | 1.5004 | 1.5022 | 1.4996 | 1.4993 | 1.5000 | 1.5007 |
| CS (IOX at 410° C. 1 hr) (MPa) | 587 | 641 | 564 | 649 | 648 | 647 |
| DOL (μm) | 23 | 20 | 27 | 23 | 22 | 22 |
| CS (IOX at 410° C. 4 hrs) (MPa) | 544 | 601 | 489 | 615 | 629 | 636 |
| DOL (μm) | 42 | 35 | 44 | 39 | 41 | 39 |
| Liquidus Air | | | | 940 | 1000 | 1025 |
| Liquidus Int | | | | 940 | 1000 | 1020 |
| Liquidus Pt | | | | 920 | 990 | 1015 |
| Phase | | | | Albite | | |
| Zircon breakdown temp | | | | | | |

| | Ex. 63 | Ex. 64 | Ex. 65 | Ex. 66 | Ex. 67 | Ex. 68 |
|---|---|---|---|---|---|---|
| Batched mol % | | | | | | |
| $SiO_2$ | 73 | 73 | 73 | 73 | 73 | 73 |
| $Al_2O_3$ | 10 | 10 | 10 | 9 | 9 | 9 |
| $Na_2O$ | 10.2 | 9.7 | 9.2 | 8.8 | 8.8 | 9.8 |
| $K_2O$ | 3 | 3 | 3 | 3.5 | 4 | 3.5 |
| MgO | | | | | | |
| CaO | 3.6 | 4.1 | 4.6 | 5.5 | 5 | 4.5 |
| $SnO_2$ | 0.2 | 0.2 | 0.2 | 0.2 | 0.2 | 0.2 |
| Analyzed mol % | | | | | | |
| $Al_2O_3$ | 9.98 | 9.99 | 9.96 | | | |
| CaO | 3.63 | 4.15 | 4.62 | | | |

TABLE V-continued

Glass compositions (batched and after formation).

| | | | |
|---|---|---|---|
| Cl | 0.04 | 0.04 | 0.03 |
| $Fe_2O_3$ | 0.01 | 0.01 | 0.01 |
| $K_2O$ | 2.81 | 2.82 | 2.85 |
| MgO | 0.11 | 0.11 | 0.13 |
| $Na_2O$ | 9.94 | 9.41 | 8.95 |
| $SO_3$ | 0.00 | 0.00 | 0.00 |
| $SiO_2$ | 73.27 | 73.27 | 73.25 |
| $SnO_2$ | 0.19 | 0.19 | 0.19 |
| SrO | 0.01 | 0.01 | 0.01 |
| ZnO | 0.01 | 0.00 | 0.00 |
| Fulchers | | | |
| A | −2.412 | −2.707 | −2.569 |
| B | 8026.6 | 8668.3 | 8190.2 |
| To | 79.5 | 46.3 | 91.4 |
| 200 | 1783 | 1777 | 1773 |
| 35000 | 1233 | 1242 | 1243 |
| 100000 | 1162 | 1171 | 1173 |
| 160000 | 1133 | 1142 | 1145 |
| 200000 | 1120 | 1129 | 1132 |
| Density | 2.43 | 2.431 | 2.433 |
| Strain | 582 | 591 | 605 |
| Anneal | 635 | 646 | 659 |
| Softening | 887.2 | 902.7 | 908.6 |
| Expansion | 79.2 | 77.4 | 76.7 |
| 10^11 | 723 | 736 | 747 |
| SOC | 30.52 | 30.31 | 30.56 |
| refractive index | 1.5014 | 1.5020 | 1.5027 |
| CS (IOX at 410° C. 1 hr) (MPa) | 608 | 628 | 610 |
| DOL (μm) | 20 | 20 | 20 |
| CS (IOX at 410° C. 4 hrs) (MPa) | 634 | 630 | 625 |
| DOL (μm) | 39 | 36 | 38 |
| Liquidus Air | 1060 | 1100 | 1120 |
| Liquidus Int | 1060 | 1100 | 1120 |
| Liquidus Pt | 1060 | 1095 | 1120 |
| Phase Zircon breakdown temp | | | |

| | Ex. 69 | Ex. 70 | Ex. 71 | Ex. 72 | Ex. 73 | Ex. 74 |
|---|---|---|---|---|---|---|
| Batched mol% | | | | | | |
| $SiO_2$ | 73 | 73 | 73 | 72 | 73 | 73 |
| $Al_2O_3$ | 9 | 9.5 | 9.5 | 9 | 9.6 | 9 |
| $Na_2O$ | 9.8 | 10.8 | 10.8 | 13.8 | 14.4 | 12.8 |
| $K_2O$ | 4 | 3 | 2.5 | 2 | 0.4 | 1 |
| MgO | 2.2 | 3 | | | | |
| CaO | 4 | 3.5 | 4 | 3 | 0.4 | 1 |
| $SnO_2$ | 0.2 | 0.2 | 0.2 | 0.2 | | |

| | Ex. 75 | Ex. 76 | Ex. 77 | Ex. 78 | Ex. 79 |
|---|---|---|---|---|---|
| Batched mol % | | | | | |
| $SiO_2$ | 72.5 | 72 | 73 | 73 | 73 |
| $Al_2O_3$ | 9.5 | 10 | 9 | 9 | 9 |
| $Na_2O$ | 12.8 | 12.8 | 10 | 9 | 9 |
| $K_2O$ | 1.5 | 1.9 | 3 | 3.5 | 4 |
| MgO | 1.8 | 1.3 | 0 | 0 | 0 |
| CaO | 1.9 | 2 | 5 | 5.5 | 5 |
| $SnO_2$ | | | | | |

It will be apparent to those skilled in the art that various modifications and variations can be made without departing from the spirit or scope of the invention.

What is claimed is:
1. A glass article formed from a glass composition consisting essentially of:
at least 65 mol % $SiO_2$;
$Al_2O_3$ in the range from 7 mol % to 11 mol %;
$Na_2O$ in the range from 13 mol % to 16 mol %;
a non-zero amount of one or more alkali earth metal oxides selected from MgO, CaO and ZnO;
$P_2O_5$; and
optionally $SnO_2$,
wherein the sum of the alkali earth metal oxides is up to 6 mol %, and the glass composition is substantially free of $K_2O$ and $B_2O_3$,
further comprising a Vickers indentation crack initiation load of at least 8 kgf.

2. The glass article of claim 1, further comprising a Vickers indentation crack initiation load of at least 14 kgf.

3. The glass article of claim 1, wherein the glass article is formed using any one of a float process and a fusion process.

4. The glass article of claim 1, wherein the glass composition from which the glass article is formed contains a non-zero amount of $P_2O_5$ up to 3 mol %.

5. The glass article of claim 1, wherein the glass composition from which the glass article is formed contains at least 70 mol % of $SiO_2$.

6. The glass article of claim 1, wherein the sum of the alkali earth metal oxides in the glass composition from which the glass article is formed is in the range from 2 mol % to 6 mol %.

7. The glass article of claim 1, wherein the glass composition from which the glass article is formed contains $SnO_2$.

8. The glass article of claim 1, further comprising a compressive stress layer extending from a surface of the glass article to a depth of layer, the compressive stress layer comprising a compressive stress of 500 MPa or greater and the depth of layer extending from a surface of the glass article into the glass article of 30 μm or greater.

9. The glass article of claim 8, wherein the compressive stress is 700 MPa or greater and the depth of layer is 30 μm or greater, wherein the compressive stress layer is formed by ion exchanging the glass article for 4 hours or less.

10. A method of forming a glass article comprising:
melting a batch for a glass article having a composition consisting essentially of,
at least 65 mol % $SiO_2$,
$Al_2O_3$ in the range from 7 mol % to 11 mol %,
$Na_2O$ in the range from 13 mol % to 16 mol %,
a non-zero amount of one or more alkali earth metal oxides selected from MgO, CaO and ZnO,
$P_2O_5$; and
optionally $SnO_2$,
wherein the sum of the alkali earth metal oxides is up to 6 mol %, and the glass composition is substantially free of $K_2O$ and $B_2O_3$; and
forming the glass article using one of a fusion process or float process, wherein the glass article further comprises a Vickers indentation crack initiation load of at least 8 kgf.

11. The method of claim 10, further comprising subjecting the glass article to ion exchange treatment for less than 16 hours to form a compressive stress layer within the glass article having a compressive stress of at least 700 MPa, wherein the compressive stress layer extends from a surface of the glass article into the glass article at a depth of layer of at least 50 μm.

12. A method of forming a glass article comprising:
melting a batch for a glass article having a composition consisting essentially of,
at least 65 mol % $SiO_2$,
$Al_2O_3$ in the range from 7 mol % to 11 mol %,
$Na_2O$ in the range from 13 mol % to 16 mol %,
a non-zero amount of one or more alkali earth metal oxides selected from MgO, CaO and ZnO,
$P_2O_5$; and
optionally $SnO_2$,
wherein the sum of the alkali earth metal oxides is up to 6 mol %, the composition is substantially free of $K_2O$, and the composition has a viscosity at 1300° C. of less than about 15 kP; and
forming the glass article using one of a fusion process or float process, wherein the glass article further comprises a Vickers indentation crack initiation load of at least 8 kgf.

* * * * *

UNITED STATES PATENT AND TRADEMARK OFFICE
CERTIFICATE OF CORRECTION

PATENT NO. : 11,274,057 B2
APPLICATION NO. : 16/184479
DATED : March 15, 2022
INVENTOR(S) : Timothy Michael Gross et al.

It is certified that error appears in the above-identified patent and that said Letters Patent is hereby corrected as shown below:

In the Claims

In Column 34, Line 21, in Claim 12, after "to" insert -- about --.

Signed and Sealed this
Eighth Day of August, 2023

Katherine Kelly Vidal
*Director of the United States Patent and Trademark Office*